US008017720B2

(12) United States Patent
Bojkova et al.

(10) Patent No.: US 8,017,720 B2
(45) Date of Patent: Sep. 13, 2011

(54) SULFUR-CONTAINING OLIGOMERS AND HIGH INDEX POLYURETHANES PREPARED THEREFROM

(75) Inventors: Nina V. Bojkova, Monroeville, PA (US); Robert D. Herold, Monroeville, PA (US); William H. McDonald, West Mars, PA (US); Marvin J. Graham, Monroeville, PA (US); Robert A. Smith, Murrysville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1088 days.

(21) Appl. No.: 11/303,707

(22) Filed: Dec. 16, 2005

(65) Prior Publication Data

US 2007/0142605 A1 Jun. 21, 2007

(51) Int. Cl.
*C08G 75/04* (2006.01)
*C08G 18/00* (2006.01)

(52) U.S. Cl. ............... 528/375; 528/59; 528/60; 528/65; 528/75; 528/76; 528/80; 528/85; 528/373; 528/374; 528/376; 359/241; 359/580; 252/182.17; 252/182.2; 252/182.24; 252/182.28

(58) Field of Classification Search ..................... 528/44, 528/76, 376, 59, 61, 65, 80, 85, 60, 373, 528/374, 375; 525/212, 123, 131, 127, 457, 525/458; 526/286; 252/182.17, 182.2, 182.24, 252/182.28; 348/902; 359/241, 580; 523/123, 523/131, 127, 457, 458

See application file for complete search history.

(56) References Cited

U.S. PATENT DOCUMENTS

| | | | |
|---|---|---|---|
| 2,370,567 A | 2/1945 | Muskat et al. | |
| 2,403,113 A | 7/1946 | Muskat et al. | |
| 2,644,007 A | 6/1953 | Irwin | 260/354 |
| 2,680,127 A | 6/1954 | Slocombe et al. | 260/453 |
| 2,908,703 A | 10/1959 | Latourette et al. | |
| 2,965,650 A | 12/1960 | Howard, Jr. | |
| 2,965,651 A | 12/1960 | Kosmin | |
| 3,169,945 A | 2/1965 | Hostettler et al. | |
| 3,361,706 A | 1/1968 | Meriwether et al. | 260/39 |
| 3,562,172 A | 2/1971 | Ono et al. | 252/300 |
| 3,567,605 A | 3/1971 | Becker | 204/158 |
| 3,578,602 A | 5/1971 | Ono et al. | 252/300 |
| 3,725,229 A * | 4/1973 | Kehr et al. | 522/97 |
| 3,766,148 A | 10/1973 | Taub | |
| 3,866,242 A | 2/1975 | Slagel | |
| 3,971,892 A | 7/1976 | Schlichte | |
| 4,095,637 A | 6/1978 | Krishnan | |
| 4,101,529 A | 7/1978 | Ammons | |
| 4,153,777 A | 5/1979 | Slagel | |
| 4,160,853 A | 7/1979 | Ammons | 428/425 |
| 4,166,043 A | 8/1979 | Uhlmann et al. | 252/300 |
| 4,208,507 A | 6/1980 | Stutz et al. | |
| 4,215,010 A | 7/1980 | Hovey et al. | 252/300 |
| 4,342,668 A | 8/1982 | Hovey et al. | 252/586 |
| 4,365,051 A | 12/1982 | Chung et al. | |
| 4,367,170 A | 1/1983 | Uhlmann et al. | 252/586 |
| 4,556,605 A | 12/1985 | Mogami et al. | |
| 4,581,433 A | 4/1986 | Potter et al. | |
| 4,637,698 A | 1/1987 | Kwak et al. | 351/163 |
| 4,719,296 A | 1/1988 | Irie et al. | |
| 4,720,356 A | 1/1988 | Chu | |
| 4,731,264 A | 3/1988 | Lin et al. | |
| 4,756,973 A | 7/1988 | Sakagami et al. | |
| 4,764,430 A | 8/1988 | Blackburn et al. | |
| 4,798,745 A | 1/1989 | Martz et al. | |
| 4,798,746 A | 1/1989 | Claar et al. | |
| 4,808,690 A | 2/1989 | Slagel | |
| 4,810,812 A | 3/1989 | Matsuda et al. | |
| 4,816,584 A | 3/1989 | Kwak et al. | 544/71 |
| 4,818,096 A | 4/1989 | Heller et al. | 351/163 |
| 4,826,977 A | 5/1989 | Heller et al. | 544/70 |
| 4,856,857 A | 8/1989 | Takeuchi et al. | |
| 4,866,103 A | 9/1989 | Cassidy et al. | |
| 4,873,027 A | 10/1989 | Umemoto et al. | |
| 4,880,667 A | 11/1989 | Welch | 427/160 |
| 4,889,413 A | 12/1989 | Ormsby et al. | |
| 4,892,920 A | 1/1990 | Quay et al. | |
| 4,904,525 A | 2/1990 | Taniguchi et al. | |
| 4,931,219 A | 6/1990 | Kwiatkowski et al. | 252/586 |
| 4,931,220 A | 6/1990 | Haynes et al. | 252/586 |
| 5,066,818 A | 11/1991 | Gemert et al. | 549/389 |
| 5,071,951 A | 12/1991 | Ulrich et al. | |
| 5,104,692 A | 4/1992 | Belmares | |
| 5,128,433 A | 7/1992 | LeCompte et al. | |
| 5,134,191 A | 7/1992 | Takarada et al. | |
| 5,158,922 A | 10/1992 | Hinney et al. | |
| 5,166,345 A | 11/1992 | Akashi et al. | |
| 5,191,055 A | 3/1993 | Kanemura et al. | |
| 5,196,485 A | 3/1993 | McMonigal et al. | |
| 5,225,472 A | 7/1993 | Cameron et al. | 524/368 |

(Continued)

FOREIGN PATENT DOCUMENTS

| | | |
|---|---|---|
| DE | 116520 | 11/1975 |
| DE | 3201224 C2 | 9/1989 |
| EP | 0 116 735 A1 | 2/1984 |

(Continued)

OTHER PUBLICATIONS

Young, D.M. et al., "Polyesters From Lactones," Research Department, Carbide and Carbon Chemicals Company, South Charleston, WV.

Ullmann's Encyclopedia of Industrial Chemistry, 5$^{th}$ Edition, 1992, vol. A21, pp. 673 to 674.

*Primary Examiner* — Milton I Cano
*Assistant Examiner* — Michael Leonard
(74) *Attorney, Agent, or Firm* — Deborah M. Altman

(57) ABSTRACT

The present invention provides polythiol oligomer formed by the reaction of at least two or more different dienes and at least one or more dithiol wherein stoichiometric ratio of the sum of the number of equivalents of all polythiols to the sum of the number of equivalents of all dienes used to form the polythiol oligomer is greater than 1.0:1.0; and wherein the two or more different dienes comprise
(a) at least one non-cyclic diene and at least one cyclic diene; or
(b) at least one aromatic ring-containing diene and at least one non-aromatic cyclic diene; or
(c) at least one non-aromatic monocyclic diene and at least one non-aromatic polycyclic diene;
Sulfur-containing polyurethane of the present invention can be prepared by combining polyisocyanate, polyisothiocyanate, or mixture thereof; the polythiol oligomer described above; and active hydrogen-containing material.

47 Claims, No Drawings

U.S. PATENT DOCUMENTS

| Patent No. | | Date | Inventor | Class |
|---|---|---|---|---|
| 5,231,156 | A | 7/1993 | Lin | |
| 5,236,958 | A | 8/1993 | Miyashita | |
| 5,236,978 | A | 8/1993 | Selvig et al. | |
| 5,238,931 | A | 8/1993 | Yoshikawa et al. | 514/184 |
| 5,239,012 | A | 8/1993 | McEntire et al. | |
| 5,252,742 | A | 10/1993 | Miyashita | |
| 5,256,452 | A | 10/1993 | McMonigal | |
| 5,274,132 | A | 12/1993 | VanGemert | 549/389 |
| 5,310,577 | A | 5/1994 | Mase et al. | |
| 5,323,191 | A | 6/1994 | Firtion et al. | |
| 5,352,758 | A | 10/1994 | Kanemura et al. | |
| 5,359,035 | A | 10/1994 | Habermann | |
| 5,359,085 | A | 10/1994 | Iwamoto et al. | |
| 5,373,033 | A | 12/1994 | Toh et al. | |
| 5,384,077 | A | 1/1995 | Knowles | 252/586 |
| 5,384,379 | A | 1/1995 | Bader et al. | |
| 5,391,327 | A | 2/1995 | Ligas et al. | |
| 5,405,958 | A | 4/1995 | VanGemert | 544/71 |
| 5,429,774 | A | 7/1995 | Kumar | 252/586 |
| 5,462,806 | A | 10/1995 | Konishi et al. | |
| 5,466,398 | A | 11/1995 | Van Gemert et al. | 252/586 |
| 5,470,813 | A | 11/1995 | Le-Khac | |
| 5,482,908 | A | 1/1996 | Le-Khac | |
| 5,488,119 | A | 1/1996 | Fischer-Reimann et al. | |
| 5,496,641 | A | 3/1996 | Mase et al. | |
| 5,498,686 | A | 3/1996 | Effer et al. | |
| 5,552,091 | A | 9/1996 | Kumar | |
| 5,602,198 | A | 2/1997 | Das et al. | |
| 5,618,586 | A | 4/1997 | Swarup et al. | |
| 5,621,017 | A | 4/1997 | Kobayakawa et al. | |
| 5,631,339 | A | 5/1997 | Faler et al. | |
| 5,645,767 | A | 7/1997 | Van Gemert | |
| 5,646,230 | A | 7/1997 | Pantone et al. | |
| 5,658,501 | A | 8/1997 | Kumar et al. | |
| 5,663,244 | A | 9/1997 | Barancyk et al. | |
| 5,679,756 | A | 10/1997 | Zhu et al. | |
| 5,684,083 | A | 11/1997 | Temple et al. | |
| 5,693,738 | A | 12/1997 | Okazaki et al. | 528/51 |
| 5,698,141 | A | 12/1997 | Kumar | |
| 5,739,243 | A | 4/1998 | Herold et al. | |
| 5,753,146 | A | 5/1998 | Van Gemert et al. | |
| 5,770,115 | A | 6/1998 | Misura | |
| 5,776,376 | A | 7/1998 | Nagoh et al. | |
| 5,807,975 | A | 9/1998 | Amagi et al. | |
| 5,811,503 | A | 9/1998 | Herold et al. | |
| 5,811,506 | A | 9/1998 | Slagel | |
| 5,814,410 | A | 9/1998 | Singer et al. | |
| 5,821,287 | A | 10/1998 | Hu et al. | |
| 5,830,578 | A | 11/1998 | Ono et al. | |
| 5,910,522 | A | 6/1999 | Schmidt et al. | |
| 5,917,006 | A | 6/1999 | Smith et al. | |
| 5,932,681 | A | 8/1999 | Herold et al. | |
| 5,942,158 | A | 8/1999 | Okoroafor et al. | |
| 5,945,504 | A | 8/1999 | Amagi et al. | |
| 5,961,889 | A | 10/1999 | Jiang et al. | |
| 5,962,617 | A | 10/1999 | Slagel | |
| 5,962,619 | A | 10/1999 | Seneker et al. | |
| 5,976,422 | A | 11/1999 | Okoroafor et al. | |
| 5,976,701 | A | 11/1999 | Barancyk et al. | |
| 6,025,026 | A | 2/2000 | Smith et al. | |
| 6,042,737 | A | 3/2000 | Basil et al. | |
| 6,060,001 | A | 5/2000 | Welch et al. | |
| 6,100,362 | A | 8/2000 | Okazaki et al. | |
| 6,113,814 | A | 9/2000 | Van Gemert et al. | |
| 6,127,505 | A | 10/2000 | Slagel | |
| 6,130,307 | A | 10/2000 | Amagi et al. | |
| 6,150,430 | A | 11/2000 | Walters et al. | |
| 6,153,126 | A | 11/2000 | Kumar | |
| 6,166,129 | A | 12/2000 | Yosthauser et al. | |
| 6,174,984 | B1 | 1/2001 | Peter | |
| 6,175,450 | B1 | 1/2001 | Andreani et al. | |
| 6,187,444 | B1 | 2/2001 | Bowles, III et al. | 428/423.1 |
| 6,268,055 | B1 | 7/2001 | Walters et al. | |
| 6,296,785 | B1 | 10/2001 | Nelson et al. | |
| 6,342,571 | B1 | 1/2002 | Smith et al. | |
| 6,348,604 | B1 | 2/2002 | Nelson et al. | |
| 6,353,039 | B1 | 3/2002 | Rheinberger et al. | |
| 6,353,102 | B1 | 3/2002 | Kumar | |
| 6,417,273 | B1 * | 7/2002 | Koinuma et al. | 525/123 |
| 6,432,526 | B1 | 8/2002 | Arney | |
| 6,432,544 | B1 | 8/2002 | Stewart et al. | |
| 6,433,043 | B1 | 8/2002 | Misura et al. | |
| 6,436,525 | B1 | 8/2002 | Welch et al. | |
| 6,441,119 | B1 | 8/2002 | Kosaka | |
| 6,472,495 | B1 | 10/2002 | Yoshimura et al. | |
| 6,506,488 | B1 | 1/2003 | Stewart et al. | |
| 6,509,418 | B1 | 1/2003 | Zook et al. | 525/212 |
| 6,531,076 | B2 | 3/2003 | Crano et al. | |
| 6,555,028 | B2 | 4/2003 | Walters et al. | |
| 6,602,603 | B2 | 8/2003 | Welch et al. | |
| 6,631,021 | B2 | 10/2003 | Smith et al. | |
| 6,669,873 | B1 * | 12/2003 | Smith et al. | 252/586 |
| 6,733,887 | B2 | 5/2004 | Okoroafor et al. | |
| 7,098,290 | B1 * | 8/2006 | Okoroafor et al. | 528/60 |
| 7,144,969 | B2 | 12/2006 | McDonald | |
| 7,169,375 | B2 | 1/2007 | Chisholm | |
| 2001/0047043 | A1 | 11/2001 | Okoroafor et al. | |
| 2003/0096935 | A1 | 5/2003 | Nagpal et al. | |
| 2003/0144452 | A1 | 7/2003 | Jallouli et al. | |
| 2003/0149217 | A1 | 8/2003 | Bojkova et al. | |
| 2004/0138401 | A1 | 7/2004 | Bojkova et al. | |
| 2005/0282991 | A1 * | 12/2005 | Bojkova et al. | 528/44 |
| 2006/0008596 | A1 | 1/2006 | Pokorny et al. | |
| 2008/0146759 | A1 * | 6/2008 | Takashima et al. | 526/289 |

FOREIGN PATENT DOCUMENTS

| | | |
|---|---|---|
| EP | 0 146 136 B1 | 5/1990 |
| EP | 0 454 066 A2 | 10/1991 |
| EP | 0 578 220 A2 | 1/1994 |
| EP | 0 294 056 B1 | 4/1994 |
| EP | 0 329 387 B1 | 6/1994 |
| EP | 0 802 208 | 4/1997 |
| EP | 0 780 413 A1 | 6/1997 |
| EP | 0 936 233 A2 | 8/1999 |
| EP | 1 099 721 A1 | 5/2001 |
| EP | 0 802 208 B1 | 9/2001 |
| EP | 1 134 242 A2 | 9/2001 |
| EP | 1 197 505 A1 | 4/2002 |
| EP | 0 927 730 B1 | 9/2003 |
| EP | 1 384 736 A1 | 1/2004 |
| FR | 2 751 763 A1 | 1/1998 |
| GB | 1 419 985 | 1/1976 |
| GB | 150 1801 | 2/1978 |
| JP | 62-195383 | 8/1987 |
| JP | 62-226134 | 10/1987 |
| JP | 63-178193 | 7/1988 |
| JP | 3-2864 | 1/1991 |
| JP | 3-35236 | 2/1991 |
| JP | 3-269507 | 2/1991 |
| JP | 5-28753 | 4/1993 |
| JP | 2000-256435 | 9/2000 |
| WO | WO 96/11926 | 4/1996 |
| WO | WO 96/18926 | 6/1996 |
| WO | WO 96/19741 | 6/1996 |
| WO | WO 96/37573 | 11/1996 |
| WO | WO 97/00910 | 1/1997 |
| WO | WO 97/03373 | 1/1997 |
| WO | WO 97/05213 | 2/1997 |
| WO | WO 97/06944 | 2/1997 |
| WO | WO 97/21122 | 6/1997 |
| WO | WO 98/37115 | 8/1998 |
| WO | WO 99/29791 | 6/1999 |
| WO | WO 00/14137 | 3/2000 |
| WO | WO 00/17249 | 3/2000 |
| WO | WO 00/24449 | 5/2000 |
| WO | WO 01/36507 A1 | 5/2001 |
| WO | WO 01/36508 A1 | 5/2001 |
| WO | WO 01/66623 A1 | 9/2001 |
| WO | WO 03/011925 A1 | 2/2003 |
| WO | WO 03/042270 A1 | 5/2003 |
| WO | WO 03/044070 A1 | 5/2003 |
| WO | WO 2004/060951 A1 | 7/2004 |
| WO | WO 2004/060971 A2 | 7/2004 |
| WO | WO 2005100443 A1 * | 10/2005 |
| WO | WO 2006/130339 A1 | 12/2006 |

* cited by examiner

SULFUR-CONTAINING OLIGOMERS AND HIGH INDEX POLYURETHANES PREPARED THEREFROM

The present invention relates to sulfur-containing polyurethanes and methods for their preparation.

A number of organic polymeric materials, such as plastics, have been developed as alternatives and replacements for glass in applications such as optical lenses, fiber optics, windows and automotive, nautical and aviation transparencies. These polymeric materials can provide advantages relative to glass, including, shatter resistance, lighter weight for a given application, ease of molding and ease of dying. However, the refractive indices of many polymeric materials are generally lower than that of glass. In ophthalmic applications, the use of a polymeric material having a lower refractive index will require a thicker lens relative to a material having a higher refractive index. A thicker lens is not desirable.

Thus, there is a need in the art to develop a polymeric material having high refractive index and good Abbe Number, impact resistance/strength, and optical transparency.

For the purposes of this specification, unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The present invention provides polythiol oligomer formed by the reaction of at least two or more different dienes and at least one or more dithiol wherein stoichiometric ratio of the sum of the number of equivalents of all polythiols to the sum of the number of equivalents of all dienes used to form said polythiol oligomer is greater than 1.0:1.0. In a non-limiting embodiment, said two or more different dienes can comprise:

(a) at least one non-cyclic diene and at least one cyclic diene; or (b) at least one aromatic ring-containing diene and at least one non-aromatic cyclic diene; or (c) at least one non-aromatic monocyclic diene and at least one non-aromatic polycyclic diene.

In a non-limiting embodiment, said cyclic diene of (a) can be selected from non-aromatic monocyclic dienes, non-aromatic polycyclic dienes, aromatic ring-containing dienes, and mixtures thereof. In a non-limiting embodiment, said non-aromatic cyclic diene of (b) can be selected from non-aromatic monocyclic dienes, non-aromatic polycyclic dienes, and mixtures thereof. In non-limiting embodiments, said stoichiometric ratio can be from greater than 1.0:1.0 to 3.0:1.0, or from 1.01:1.0 to 3.0:1.0, or from 1.01:1.0 to 2.0:1.0, or from 1.05:1.0 to 2.0:1.0, or from 1.1:1.0 to 1.5:1.0, or from 1.25:1.0 to 1.5:1.0.

In a further non-limiting embodiment, polythiol oligomer of the present invention can include polythiol oligomer formed by the reaction of two or more different dienes, one or more dithiol, and optionally trifunctional or higher-functional polythiol, wherein stoichiometric ratio of the sum of the number of equivalents of all polythiols to the sum of the number of equivalents of all dienes used to form said polythiol oligomer is greater than 1.0:1.0.

In a non-limiting embodiment, sulfur-containing polyurethane of the present invention can comprise the reaction product of polyisocyanate, polyisothiocyanate, or mixture thereof; polythiol oligomer; and active hydrogen-containing material. In a non-limiting embodiment, said polythiol oligomer can included polythiol oligomer formed by the reaction of at least two or more different dienes and at least one or more dithiol, wherein stoichiometric ratio of the sum of the number of equivalents of all polythiols to the sum of the number of equivalents of all dienes used to form said polythiol oligomer is greater than 1.0:1.0. In a further non-limiting embodiment, said active hydrogen-containing material can include at least one material selected from trifunctional or higher-functional polyol, trifunctional or higher-functional polythiol, trifunctional or higher-functional material, containing both hydroxyl and SH groups, or mixtures thereof. In a further non-limiting embodiment, said active hydrogen-containing material can further comprise at least one material selected from diol, dithiol, difunctional material including both hydroxyl and SH groups, or mixtures thereof. In a further non-limiting embodiment, said dithiol can include dithiol oligomer. In a further non-limiting embodiment, said stoichiometric ratio can be from 1.1:1.0 to 1.5:1.0.

In a further non-limiting embodiment polythiol oligomer used to prepare said sulfur-containing polyurethane can include polythiol oligomer formed by the reaction of at least two or more different dienes, at least one or more dithiol, and optionally trifunctional or higher-functional polythiol; wherein the stoichiometric ratio of the sum of the number of equivalents of all polythiols to the sum of the number of equivalents of all dienes used to form said polythiol oligomer is greater than 1.0:1.0.

As used herein and in the claims, when referring to the dienes used in this reaction, the term "different dienes" can include the following non-limiting embodiments:

(a) at least one non-cyclic diene and at least one cyclic diene;

(b) at least one aromatic ring-containing diene and at least one non-aromatic cyclic diene; or (c) at least one non-aromatic monocyclic diene and at least one non-aromatic polycyclic diene.

In a further non-limiting embodiment, said cyclic diene of (a) can include non-aromatic monocyclic dienes, non-aromatic polycyclic dienes or combinations or mixtures thereof, or aromatic ring-containing dienes, or mixtures thereof. In a further non-limiting embodiment, said non-aromatic cyclic diene of (b) can include non-aromatic monocyclic dienes, non-aromatic polycyclic diene, or combinations or mixtures thereof.

As used herein and in the claims, the terms "isocyanate" and "isothiocyanate" refer to materials that are unblocked and capable of forming a covalent bond with a reactive group such as a thiol or hydroxyl functional group. In alternate non-limiting embodiments, the polyisocyanate of the present invention can contain at least two functional groups chosen from isocyanate (NCO), and the polyisothiocyanate can contain at least two functional groups chosen from isothiocyanate (NCS). In another non-limiting embodiment, the polyisothiocyanate of the present invention can contain at least two functional groups chosen from isothiocyanate, and combinations of isocyanate and isothiocyanate functional groups.

In alternate non-limiting embodiments, the sulfur-containing polyurethane of the invention when polymerized can produce a polymerizate having a refractive index of at least 1.55, of at least 1.56, of at least 1.57, or at least 1.58, or at least 1.59, or at least 1.60, or at least 1.61, or at least 1.62, or at least 1.65. In further alternate non-limiting embodiments, the sulfur-containing polyurethane of the invention when polymerized can produce a polymerizate having an Abbe number of at least 30, or at least 32, or at least 34, or at least 35, or at least 36, or at least 38, or at least 39, or at least 40, or at least 44. The refractive index and Abbe number can be determined by methods known in the art such as American Standard Test Method (ASTM) Number D 542-00. Further, the refractive index and Abbe number can be determined using various known instruments. In a non-limiting embodiment of the present invention, the refractive index and Abbe number can be measured in accordance with ASTM D 542-00 with the following exceptions: (i) test one to two samples/specimens instead of the minimum of three specimens specified in Section 7.3; and (ii) test the samples unconditioned instead of conditioning the samples/specimens prior to testing as specified in Section 8.1. Further, in a non-limiting embodiment, an Atago, model DR-M2 Multi-Wavelength Digital Abbe Refractometer can be used to measure the refractive index and Abbe number of the samples/specimens.

In a non-limiting embodiment, sulfur-containing polyurethane of the present invention can be prepared by (a) reacting polyisocyanate and/or polyisothiocyanate; polythiol oligomer formed by the reaction of at least two or more different dienes and at least one or more dithiol, wherein stoichiometric ratio of the sum of the number of equivalents of all polythiols to the sum of the number of equivalents of all dienes used to form said polythiol oligomer is greater than 1.0:1.0; and active hydrogen-containing material including at least one material selected from trifunctional or higher-functional polyol, trifunctional or higher-functional polythiol, trifunctional or higher-functional material containing both hydroxyl and SH groups, or mixtures thereof; to form sulfur-containing polyurethane prepolymer; and (b) reacting said sulfur-containing polyurethane prepolymer with active hydrogen-containing material including at least one material selected from polyol, polythiol, polyfunctional material containing both hydroxyl and SH groups, or mixtures thereof; to form said sulfur-containing polyurethane.

In a further non-limiting embodiment, said active hydrogen-containing material of (a) used to form said sulfur-containing polyurethane prepolymer can further comprise at least one material selected from diol, dithiol, difunctional material including both hydroxyl and SH groups, or mixtures thereof. In a further non-limiting embodiment, said dithiol of (a) can include dithiol oligomer. In a further non-limiting embodiment, said polythiol of (b) can include dithiol oligomer.

In an alternate non-limiting embodiment, sulfur-containing polyurethane of the present invention can be prepared by (a) reacting polyisocyanate and/or polyisothiocyanate; and polythiol oligomer formed by the reaction of at least two or more different dienes and at least one or more dithiol, wherein stoichiometric ratio of the sum of the number of equivalents of all polythiols to the sum of the number of equivalents of all dienes used to form said polythiol oligomer is greater than 1.0:1.0; to form sulfur-containing polyurethane prepolymer; and (b) reacting said sulfur-containing polyurethane prepolymer with active hydrogen-containing material including at least one material selected from trifunctional or higher-functional polyol, trifunctional or higher-functional polythiol, trifunctional or higher-functional material containing both hydroxyl and SH groups, or mixtures thereof; to form said sulfur-containing polyurethane.

In a further non-limiting embodiment, (a) can further comprise active hydrogen-containing material including at least one material selected from polyol, polythiol, polyfunctional material containing both hydroxyl and SH groups, or mixtures thereof. In a non-limiting embodiment, said polythiol can include dithiol oligomer. In a further non-limiting embodiment, said active hydrogen-containing material of (b) can further comprise at least one material selected from diol, dithiol, difunctional material including both hydroxyl and SH groups, or mixtures thereof. In a further non-limiting embodiment, said dithiol can include dithiol oligomer.

In alternate non-limiting embodiments, the amount of polyisocyanate and the amount of active hydrogen-containing material used to prepare isocyanate terminated sulfur-containing polyurethane prepolymer can be selected such that the equivalent ratio of (NCO):(SH+OH) can be greater than 1.0:1.0, or at least 2.0:1.0, or at least 2.5:1, or less than 4.5:1.0, or less than 5.5:1.0.

In alternate non-limiting embodiments, the amount of polyisothiocyanate or mixture of polyisocyanate and polyisothiocyanate and the amount of active hydrogen-containing material used to prepare isothiocyanate or isocyanate/isothiocyanate terminated sulfur-containing polyurethane prepolymer can be selected such that the equivalent ratio of (NCO+NCS):(SH+OH) can be greater than 1.0:1.0, or at least 2.0:1.0, or at least 2.5:1, or less than 4.5:1.0, or less than 5.5:1.0.

In non-limiting embodiments, the amount of isocyanate terminated sulfur-containing polyurethane prepolymer and the amount of active hydrogen containing materials reacted with said prepolymer to form sulfur-containing polyurethane can be selected such that the equivalent ratio of (OH+SH):(NCO) is from 1.1:1.0 to 0.85:1.0, or from 1.1:1.0 to 0.90:1.0, or from 1.0:1.0 to 0.85:1.0, or from 1.0:1.0 to 0.90:1.0.

In non-limiting embodiments, the amount of isothiocyanate or isocyanate/isothiocyanate terminated sulfur-containing polyurethane prepolymer and the amount of active hydrogen containing materials reacted with said prepolymer to form sulfur-containing polyurethane can be selected such that the equivalent ratio of (OH+SH):(NCS+NCO) is from 1.1:1.0 to 0.85:1.0, or from 1.1:1.0 to 0.90:1.0, or from 1.0:1.0 to 0.85:1.0, or from 1.0:1.0 to 0.90:1.0.

Polyisocyanates and polyisothiocyanates useful in the preparation of the sulfur-containing polyurethane of the present invention are numerous and widely varied. Suitable polyisocyanates for use in the present invention can include but are not limited to polymeric and $C_2$-$C_{20}$ linear, branched, cycloaliphatic and aromatic polyisocyanates. Suitable polyisothiocyanates for use in the present invention can include but are not limited to polymeric and $C_2$-$C_{20}$ linear, branched, cyclic and aromatic polyisothiocyanates. Non-limiting examples can include polyisocyanates and polyisothiocyanates having backbone linkages chosen from urethane linkages (—NH—C(O)—O—), thiourethane linkages (—NH—C(O)—S—), thiocarbamate linkages (—NH—C(S)—O—), dithiourethane linkages (—NH—C(S)—S—) and combinations thereof.

The molecular weight of the polyisocyanate and polyisothiocyanate can vary widely. In alternate non-limiting embodiments, the number average molecular weight (Mn) of each can be at least 100 grams/mole, or at least 150 grams/mole, or less than 15,000 grams/mole, or less than 5000 grams/mole. The number average molecular weight can be determined using known methods. The number average molecular weight values recited herein and the claims were determined by gel permeation chromatography (GPC) using polystyrene standards.

Non-limiting examples of suitable polyisocyanates and polyisothiocyanates can include but are not limited to polyisocyanates having at least two isocyanate groups; polyisothiocyanates having at least two isothiocyanate groups; mixtures thereof; and combinations thereof, such as a material having isocyanate and isothiocyanate functionality.

Non-limiting examples of polyisocyanates can include but are not limited to aliphatic polyisocyanates, cycloaliphatic polyisocyanates wherein one or more of the isocyanate groups are attached directly to the cycloaliphatic ring, cycloaliphatic polyisocyanates wherein one or more of the isocyanate groups are not attached directly to the cycloaliphatic ring, aromatic polyisocyanates wherein one or more of the isocyanate groups are attached directly to the aromatic ring, and aromatic polyisocyanates wherein one or more of the isocyanate groups are not attached directly to the aromatic ring. When an aromatic polyisocyanate is used, generally care should be taken to select a material that does not cause the sulfur-containing polyurethane to color (e.g., yellow).

In a non-limiting embodiment of the present invention, the polyisocyanate can include but is not limited to aliphatic or cycloaliphatic diisocyanates, aromatic diisocyanates, cyclic dimers and cyclic trimers thereof, and mixtures thereof. Non-limiting examples of suitable polyisocyanates can include but are not limited to Desmodur N 3300 (hexamethylene diisocyanate trimer) which is commercially available from Bayer; Desmodur N 3400 (60% hexamethylene diisocyanate dimer and 40% hexamethylene diisocyanate trimer).

In a non-limiting embodiment, the polyisocyanate can include dicyclohexylmethane diisocyanate and isomeric mixtures thereof. As used herein and the claims, the term "isomeric mixtures" refers to a mixture of the cis-cis, trans-trans, and cis-trans isomers of the polyisocyanate. Non-limiting examples of isomeric mixtures for use in the present invention can include the trans-trans isomer of 4,4'-methylenebis(cyclohexyl isocyanate), hereinafter referred to as "PICM" (paraisocyanato cyclohexylmethane), the cis-trans isomer of PICM, the cis-cis isomer of PICM, and mixtures thereof.

In one non-limiting embodiment, three suitable isomers of 4,4'-methylenebis(cyclohexyl isocyanate) for use in the present invention are shown below.

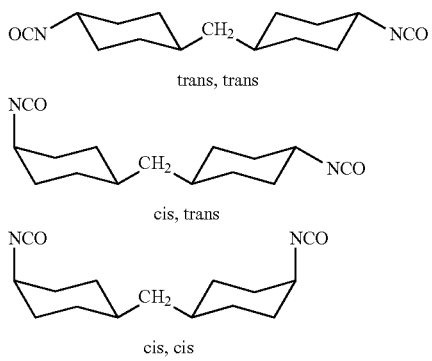

In one non-limiting embodiment, the PICM used in this invention can be prepared by phosgenating the 4,4'-methylenebis(cyclohexyl amine) (PACM) by procedures well known in the art such as the procedures disclosed in U.S. Pat. Nos. 2,644,007 and 2,680,127 which are incorporated herein by reference. The PACM isomer mixtures, upon phosgenation, can produce PICM in a liquid phase, a partially liquid phase, or a solid phase at room temperature. The PACM isomer mixtures can be obtained by the hydrogenation of methylenedianiline and/or by fractional crystallization of PACM isomer mixtures in the presence of water and alcohols such as methanol and ethanol.

In a non-limiting embodiment, the isomeric mixture can contain from 10-100 percent of the trans,trans isomer of 4,4'-methylenebis(cyclohexyl isocyanate)(PICM).

Additional aliphatic and cycloaliphatic diisocyanates that can be used in alternate non-limiting embodiments of the present invention include 3-isocyanato-methyl-3,5,6-trimethyl cyclohexyl-isocyanate ("IPDI") which is commercially available from Arco Chemical, and meta-tetramethylxylylene diisocyanate (1,3-bis(1-isocyanato-1-methylethyl)-benzene) which is commercially available from Cytec Industries Inc. under the trade name TMXDI® (Meta) Aliphatic Isocyanate.

As used herein and the claims, the terms aliphatic and cycloaliphatic diisocyanates refer to 6 to 100 carbon atoms linked in a straight chain or cyclic having two diisocyanate reactive end groups. In a non-limiting embodiment of the present invention, the aliphatic and cycloaliphatic diisocyanates for use in the present invention can include TMXDI and compounds of the formula $R-(NCO)_2$ wherein R represents an aliphatic group or a cycloaliphatic group.

Further non-limiting examples of suitable polyisocyanates and polyisothiocyanates can include but are not limited to aliphatic polyisocyanates and polyisothiocyanates; ethylenically unsaturated polyisocyanates and polyisothiocyanates; alicyclic polyisocyanates and polyisothiocyanates; aromatic polyisocyanates and polyisothiocyanates wherein the isocyanate groups are not bonded directly to the aromatic ring, e.g., α,α'-xylylene diisocyanate; aromatic polyisocyanates and polyisothiocyanates wherein the isocyanate groups are bonded directly to the aromatic ring, e.g., benzene diisocyanate; aliphatic polyisocyanates and polyisothiocyanates containing sulfide linkages; aromatic polyisocyanates and polyisothiocyanates containing sulfide or disulfide linkages; aromatic polyisocyanates and polyisothiocyanates containing sulfone linkages; sulfonic ester-type polyisocyanates and polyisothiocyanates, e.g., 4-methyl-3-isocyanatobenzene-sulfonyl-4'-isocyanato-phenol ester; aromatic sulfonic amide-type polyisocyanates and polyisothiocyanates; sulfur-containing heterocyclic polyisocyanates and polyisothiocyanates, e.g., thiophene-2,5-diisocyanate; halogenated, alkylated, alkoxylated, nitrated, carbodiimide modified, urea modified and biuret modified derivatives of polycyanates thereof; and dimerized and trimerized products of polycyanates thereof.

In a further non-limiting embodiment, a material of the following general formula (I) can be used:

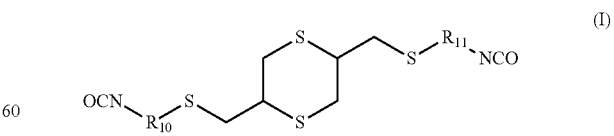

wherein $R_{10}$ and $R_{11}$ are each independently $C_1$ to $C_3$ alkyl.

Further non-limiting examples of aliphatic polyisocyanates can include ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, 2,4,4,-trimethylhexamethylene diisocyanate, 1,6,11-undecanetriisocyanate, 1,3,6-hexamethylene triisocyanate, 1,8-diisocyanato-4-(isocyanatomethyl)octane, 2,5,7-trimethyl-1,8-diisocyanato-5-(isocyanatomethyl)octane, bis(isocyanatoethyl)-carbonate, bis(isocyanatoethyl)ether, 2-isocyanatopropyl-2,6-diisocyanatohexanoate, lysinediisocyanate methyl ester and lysinetriisocyanate methyl ester.

Examples of ethylenically unsaturated polyisocyanates can include but are not limited to butene diisocyanate and 1,3-butadiene-1,4-diisocyanate. Alicyclic polyisocyanates can include but are not limited to isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane and 2-isocyanatomethyl-2-(3-isocyanatopropyl)-6-(2-isocyanatoethyl)-bicyclo[2.2.1]-heptane.

Examples of aromatic polyisocyanates wherein the isocyanate groups are not bonded directly to the aromatic ring can include but are not limited to bis(isocyanatoethyl)benzene, α,α,α',α'-tetramethylxylylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl)phthalate, mesitylene triisocyanate and 2,5-di(isocyanatomethyl)furan, and meta-xylylene diisocyanate. Aromatic polyisocyanates having isocyanate groups bonded directly to the aromatic ring can include but are not limited to phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, ortho-toluidine diisocyanate, ortho-tolylidine diisocyanate, ortho-tolylene diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, triphenylmethane triisocyanate, polymeric 4,4'-diphenylmethane diisocyanate, naphthalene triisocyanate, diphenylmethane-2,4,4'-triisocyanate, 4-methyldiphenylmethane-3,5,2',4',6'-pentaisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate and dichlorocarbazole diisocyanate.

Further non-limiting examples of aliphatic and cycloaliphatic diisocyanates that can be used in the present invention include 3-isocyanato-methyl-3,5,5-trimethyl cyclohexyl-isocyanate ("IPDI") which is commercially available from Arco Chemical, and meta-tetramethylxylene diisocyanate (1,3-bis(1-isocyanato-1-methylethyl)-benzene) which is commercially available from Cytec Industries Inc. under the tradename TMXDI® (Meta) Aliphatic Isocyanate.

In a non-limiting embodiment of the present invention, the aliphatic and cycloaliphatic diisocyanates for use in the present invention can include TMXDI and compounds of the formula R—(NCO)$_2$ wherein R represents an aliphatic group or a cycloaliphatic group.

Non-limiting examples of polyisocyanates can include aliphatic polyisocyanates containing sulfide linkages such as thiodiethyl diisocyanate, thiodipropyl diisocyanate, dithiodihexyl diisocyanate, dimethylsulfone diisocyanate, dithiodimethyl diisocyanate, dithiodiethyl diisocyanate, dithiodipropyl diisocyanate and dicyclohexylsulfide-4,4'-diisocyanate. Non-limiting examples of aromatic polyisocyanates containing sulfide or disulfide linkages include but are not limited to diphenylsulfide-2,4'-diisocyanate, diphenylsulfide-4,4'-diisocyanate, 3,3'-dimethoxy-4,4'-diisocyanatodibenzyl thioether, bis(4-isocyanatomethylbenzene)-sulfide, diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate.

Non-limiting examples polyisocyanates can include aromatic polyisocyanates containing sulfone linkages such as diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyl-diphenylsulfone-3,3'-diisocyanate and 4,4'-dichlorodiphenylsulfone-3,3'-diisocyanate.

Non-limiting examples of aromatic sulfonic amide-type polyisocyanates for use in the present invention can include 4-methyl-3-isocyanato-benzene-sulfonylanilide-3'-methyl-4'-isocyanate, dibenzenesulfonyl-ethylenediamine-4,4'-diisocyanate, 4,4'-methoxybenzenesulfonyl-ethylenediamine-3,3'-diisocyanate and 4-methyl-3-isocyanato-benzene-sulfonylanilide-4-ethyl-3'-isocyanate.

In alternate non-limiting embodiments, the polyisothiocyanate can include aliphatic polyisothiocyanates; alicyclic polyisothiocyanates, such as but not limited to cyclohexane diisothiocyanates; aromatic polyisothiocyanates wherein the isothiocyanate groups are not bonded directly to the aromatic ring, such as but not limited to α,α'-xylylene diisothiocyanate; aromatic polyisothiocyanates wherein the isothiocyanate groups are bonded directly to the aromatic ring, such as but not limited to phenylene diisothiocyanate; heterocyclic polyisothiocyanates, such as but not limited to 2,4,6-triisothicyanato-1,3,5-triazine and thiophene-2,5-diisothiocyanate; carbonyl polyisothiocyanates; aliphatic polyisothiocyanates containing sulfide linkages, such as but not limited to thiobis (3-isothiocyanatopropane); aromatic polyisothiocyanates containing sulfur atoms in addition to those of the isothiocyanate groups; halogenated, alkylated, alkoxylated, nitrated, carbodiimide modified, urea modified and biuret modified derivatives of these polyisothiocyanates; and dimerized and trimerized products of these polyisothiocyanates.

Non-limiting examples of aliphatic polyisothiocyanates include 1,2-diisothiocyanatoethane, 1,3-diisothiocyanatopropane, 1,4-diisothiocyanatobutane and 1,6-diisothiocyanatohexane. Non-limiting examples of aromatic polyisothiocyanates having isothiocyanate groups bonded directly to the aromatic ring can include but are not limited to 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanato-1,1'- biphenyl, 1,1'-methylenebis(4-isothiocyanatobenzene), 1,1'-methylenebis(4-isothiocyanato-2-methylbenzene), 1,1'-methylenebis(4-isothiocyanato-3-methylbenzene), 1,1'-(1,2-ethane-diyl)bis(4-isothiocyanatobenzene), 4,4'-diisothiocyanatobenzophenenone, 4,4'-diisothiocyanato-3,3'-dimethylbenzophenone, benzanilide-3,4'-diisothiocyanate, diphenylether-4,4'-diisothiocyanate and diphenylamine-4,4'-diisothiocyanate.

Suitable carbonyl polyisothiocyanates can include but are not limited to hexane-dioyl diisothiocyanate, nonanedioyl diisothiocyanate, carbonic diisothiocyanate, 1,3-benzenedicarbonyl diisothiocyanate, 1,4-benzenedicarbonyl diisothiocyanate and (2,2'-bipyridine)-4,4'-dicarbonyl diisothiocyanate. Non-limiting examples of aromatic polyisothiocyanates containing sulfur atoms in addition to those of the isothiocyanate groups, can include but are not limited to 1-isothiocyanato-4-[(2-isothiocyanato)sulfonyl]benzene, thiobis(4-isothiocyanatobenzene), sulfonylbis(4-isothiocyanatobenzene), sulfinylbis(4-isothiocyanatobenzene), dithiobis(4-isothiocyanatobenzene), 4-isothiocyanato-1-[(4-isothiocyanatophenyl)-sulfonyl]-2-methoxybenzene, 4-methyl-3-isothicyanatobenzene-sulfonyl-4'-isothiocyanate phenyl ester and 4-methyl-3-isothiocyanatobenzene-sulfonylanilide-3'-methyl-4'-isothiocyanate.

Non-limiting examples of materials having isocyanate and isothiocyanate groups can include materials having aliphatic, alicyclic, aromatic or heterocyclic groups and which optionally contain sulfur atoms in addition to those of the isothiocyanate groups. Non-limiting examples of such materials can include but are not limited to 1-isocyanato-3-isothiocyanatopropane, 1-isocyanato-5-isothiocyanatopentane, 1-isocyanato-6-isothiocyanatohexane, isocyanatocarbonyl isothiocyanate, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanato-4'-isothiocyanatodiphenyl sulfide and 2-isocyanato-2'-isothiocyanatodiethyl disulfide.

In further alternate non-limiting embodiments, the polyisocyanate can include meta-tetramethylxylylene diisocyanate (1,3-bis(1-isocyanato-1-methylethyl-benzene); 3-isocyanato-methyl-3,5,5-trimethyl-cyclohexyl isocyanate; 4,4-methylene bis(cyclohexyl isocyanate); meta-xylylene diisocyanate; and mixtures thereof.

In a non-limiting embodiment of the present invention, sulfur-containing polyurethane can be prepared by reacting polyisocyanate and/or polyisothiocyanate and polythiol oligomer to form sulfur-containing polyurethane prepolymer; and reacting said sulfur-containing polyurethane prepolymer with active hydrogen-containing material to form said sulfur-containing polyurethane.

In a non-limiting embodiment, polythiol oligomer for use in the present invention can be formed by the reaction of at least two or more different dienes and at least one or more dithiol wherein stoichiometric ratio of the sum of the number of equivalents of all polythiols to the sum of the number of equivalents of all dienes used to form said polythiol oligomer is greater than 1.0:1.0.

As used herein and in the claims when referring to the dienes used to prepare said polythiol oligomer, the term "different dienes" can refer to dienes that can be different from one another in any one of a variety of ways. In non-limiting embodiments, the "different diense can be different from one another in one of the following three ways: (a) non-cyclic vs. cyclic; (b) aromatic vs. non-aromatic ring-containing; or (b) non-aromatic monocyclic vs. non-aromatic polycyclic. In non-limiting embodiments, said at least two or more different dienes can comprise:

(a) at least one non-cyclic diene and at least one cyclic diene, wherein non-limiting examples of said cyclic diene can include non-aromatic ring-containing dienes including but not limited to non-aromatic monocyclic dienes, non-aromatic polycyclic dienes or combinations thereof, or aromatic ring-containing dienes, or mixtures thereof; or (b) at least one aromatic ring-containing diene and at least one non-aromatic cyclic diene, wherein non-limiting examples of said non-aromatic cyclic diene can include non-aromatic moncyclic diene, non-aromatic polycyclic, or mixtures thereof; or (c) at least one non-aromatic monocyclic diene and at least one non-aromatic polycyclic diene.

The two or more different dienes can each be independently chosen from non-cyclic dienes, including straight chain and/or branched aliphatic non-cyclic dienes, non-aromatic ring-containing dienes, including non-aromatic ring-containing dienes wherein the double bonds can be contained within the ring or not contained within the ring or any combination thereof, and wherein said non-aromatic ring-containing dienes can contain non-aromatic monocyclic groups or non-aromatic polycyclic groups or combinations thereof; aromatic ring-containing dienes; or heterocyclic ring-containing dienes; or dienes containing any combination of such non-cyclic and/or cyclic groups, and wherein said two or more different dienes can optionally contain thioether, disulfide, polysulfide, sulfone, ester, thioester, carbonate, thiocarbonate, urethane, or thiourethane linkages, or halogen substituents, or combinations thereof; with the proviso that said dienes contain double bonds capable of undergoing reaction with SH groups of polythiol, and forming covalent C—S bonds, and at least two or more of said dienes are different from one another; and the one or more dithiol can each be independently chosen from dithiols containing straight chain and/or branched non-cyclic aliphatic groups, cycloaliphatic groups, aryl groups, aryl-alkyl groups, heterocyclic groups, or combinations or mixtures thereof, and wherein said one or more dithiol can each optionally contain thioether, disulfide, polysulfide, sulfone, ester, thioester, carbonate, thiocarbonate, urethane, or thiourethane linkages, or halogen substituents, or combinations thereof; and wherein the stoichiometric ratio of the sum of the number of equivalents of all dithiols to the sum of the number of equivalents of all dienes used to form said polythiol oligomer is greater than 1.0:1.0. As used herein and in the claims, the term "number of equivalents" refers to the number of moles of a particular diene or polythiol, multiplied by the average number of thiol groups or double bond groups per molecule of said diene or polythiol, respectively.

In non-limiting embodiments, stoichiometric ratio of the sum of the number of equivalents of all polythiols to the sum of the number of equivalents of all dienes used to prepare polythiol oligomer of the present invention can be from greater than 1.0:1.0 to 3.0:1.0, or from 1.01:1.0 to 3.0:1.0, or from 1.01:1.0 to 2.0:1.0, or from 1.05:1.0 to 2.0:1.0, or from 1.1:1.0 to 1.5:1.0, or from 1.25:1.0 to 1.5:1.0.

In a further non-limiting embodiment, the stoichiometric ratio of the sum of the number of equivalents of all polythiols to the sum of the number of equivalents of all dienes used to form said polythiol oligomer can be (n+1):(n) wherein n can represent an integer from 2 to 30

The reaction mixture that consists of the group of at least two or more different dienes and the group of at least one or more dithiol and the corresponding number of equivalents of each diene and dithiol that is used to prepare the polythiol oligomer can be depicted as shown in Scheme I below:

Scheme I.

$$d_1D_1 + d_2D_2 + \cdots + d_xD_x + t_1T_1 + \cdots + t_yT_y \longrightarrow \text{polythiol oligomer;}$$

wherein $D_1$ through $D_x$ represent two or more different dienes, x is an integer greater than or equal to 2, that represents the total number of different dienes that are present; $d_1$ through $d_x$ represent the number of equivalents of each corresponding diene; $T_1$ through $T_y$ represent one or more dithiol; and $t_1$ through $t_y$ represent the number of equivalents of each corresponding dithiol; and y is an integer greater than or equal to 1 that represents the total number of dithiols present.

In a non-limiting embodiment, a group of at least two or more different dienes and the corresponding number of equivalents of each diene can be described by the term $d_iD_i$ (such as $d_1D_1$ through $d_xD_x$, as shown in Scheme I above), wherein $D_i$ represents the $i^{th}$ diene and $d_i$ represents the number of equivalents of $D_i$, i being can be an integer ranging from 1 to x, wherein x is an integer, greater than or equal to 2, that defines the total number of different dienes that are present. Furthermore, the sum of the number of equivalents of all dienes present can be represented by the term d, defined according to Expression (I), $$d = \sum_{i=1}^{x} d_i \quad \text{Expression (I)}$$

wherein i, x, and $d_i$ are as defined above.

Similarly, the group of at least one or more dithiol and the corresponding number of equivalents of each dithiol can be described by the term $t_jT_j$ (such as $t_1T_1$ through $t_yT_y$, as shown in Scheme I above), wherein $T_j$ represents the $j^{th}$ dithiol and $t_j$ represents the number of equivalents of the corresponding dithiol $T_j$, j being an integer ranging from 1 to y, wherein y is an integer that defines the total number of dithiols present, and y has a value greater than or equal to 1. Furthermore, the sum of the number of equivalents of all dithiols present can be represented by the term t, defined according to Expression (II), $$t = \sum_{j=1}^{y} t_j \quad \text{Expression (II)}$$

wherein j, y, and $t_j$ are as defined above.

The ratio of the sum of the number of equivalents of all dithiols present to the sum of the number of equivalents of all dienes present can be characterized by the term t:d, wherein t and d are as defined above. The ratio t:d can have values greater than 1:1. In non-limiting embodiments, the ratio t:d can have values within the range of from greater than 1.0:1.0 to 3.0:1.0, or from 1.01:1.0 to 3.0:1.0, or from 1.01:1.0 to 2.0:1.0, or from 1.05:1.0 to 2.0:1.0, or from 1.1:1.0 to 1.5:1.0, or from 1.25:1.0 to 1.5:1.0.

As is known in the art, for a given set of dienes and dithiols, a statistical mixture of oligomer molecules with varying molecular weights are formed during the reaction in which the polythiol oligomer is prepared, where the number average molecular weight of the resulting mixture can be calculated and predicted based upon the molecular weights of the dienes and dithiols, and the relative equivalent ratio or mole ratio of the dienes and dithiols present in the reaction mixture that is used to prepare said polythiol oligomer. As is also known to those skilled in the art, the above parameters can be varied in order to adjust the number average molecular weight of the polythiol oligomer. The following is a hypothetical example: if the value of x as defined above is 2, and the value of y is 1; and $diene_1$ has a molecular weight (MW) of 100, $diene_2$ has a molecular weight of 150, dithiol has a molecular weight of 200; and $diene_1$, $diene_2$, and dithiol are present in the following molar amounts: 2 moles of $diene_1$, 4 moles of $diene_2$, and 8 moles of dithiol; then the number average molecular weight ($M_n$) of the resulting polythiol oligomer is calculated as follows:

$$M_n = \{(\text{moles}_{diene1} \times MW_{diene1}) + (\text{moles}_{diene2} \times MW_{diene2}) + (\text{moles}_{dithiol} \times NW_{dithiol})\}/m;$$

wherein m is the number of moles of the material that is present in the smallest molar amount.

$$= \{(2 \times 100) + (4 \times 150) + (8 \times 200)\}/2 = 1200 \text{ g/mole}$$

In a non-limiting embodiment, the polythiol oligomer can be as depicted in Formula (AA') in Scheme II below, produced from the reaction of $Diene_1$ and $Diene_2$ with a dithiol; wherein $R_2$, $R_4$, $R_6$, and $R_7$ can be independently chosen from H, methyl, or ethyl, and $R_1$ and $R_3$ can be independently chosen from straight chain and/or branched aliphatic non-cyclic moieties, non-aromatic ring-containing moieties, including non-aromatic monocyclic moieties or non-aromatic polycyclic moieties or combinations thereof; aromatic ring-containing moieties; or heterocyclic ring-containing moieties; or moieties containing any combination of such non-cyclic and/or cyclic groups; with the proviso that $Diene_1$ and $Diene_2$ are different from one another, and contain double bonds capable of undergoing reaction with SH groups of dithiol, and forming covalent C—S bonds; and wherein $R_5$ can be chosen from divalent groups containing straight chain and/or branched non-cyclic aliphatic groups, cycloaliphatic groups, aryl groups, aryl-alkyl groups, heterocyclic groups, or combinations or mixtures thereof; and wherein $R_1$, $R_3$, and $R_5$ can optionally contain ether, thioether, disulfide, polysulfide, sulfone, ester, thioester, carbonate, thiocarbonate, urethane, or thiourethane linkages, or halogen substituents, or combinations thereof; and n is an integer ranging from 1 to 20.

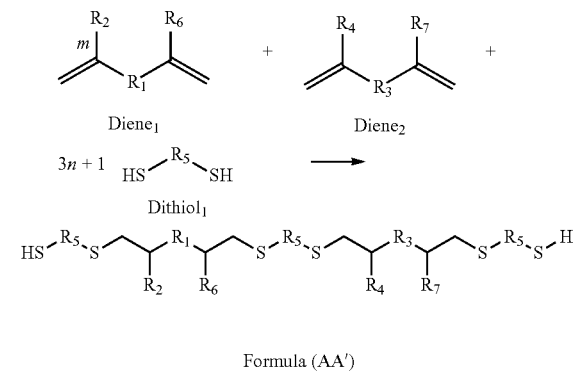

Formula (AA')

wherein $n = m + p$

In a second non-limiting embodiment, the polythiol oligomer can be as depicted in Formula (AA") in Scheme III below, produced from the reaction of $Diene_1$ and 5-vinyl-2-norbornene (VNB) with a dithiol; wherein $R_2$ and $R_4$ can be independently chosen from H, methyl, or ethyl, and $R_1$ can be chosen from straight chain and/or branched aliphatic non-cyclic moieties, non-aromatic monocyclic ring-containing moieties; aromatic ring-containing moieties; or heterocyclic ring-containing moieties; or include moieties containing any combination of such non-cyclic and/or cyclic groups; with the proviso that $Diene_1$ is different from VNB, and contains double bonds capable of reacting with SH groups of dithiol, and forming covalent C—S bonds; and wherein $R_3$ can be chosen from divalent groups containing straight chain and/or branched non-cyclic aliphatic groups, cycloaliphatic groups, aryl groups, aryl-alkyl groups, heterocyclic groups, or combinations or mixtures thereof, and wherein $R_1$ and $R_3$ can optionally contain ether, thioether, disulfide, polysulfide, sulfone, ester, thioester, carbonate, thiocarbonate, urethane, or thiourethane linkages, or halogen substituents, or combinations thereof; and n is an integer ranging from 1 to 20.

independently chosen from H, methyl, or ethyl, and $R_1$ can be chosen from straight chain and/or branched aliphatic non-cyclic moieties, non-aromatic polycyclic ring-containing moieties; aromatic ring-containing moieties; or heterocyclic ring-containing moieties; or moieties containing any combination of such non-cyclic and/or cyclic groups; with the proviso that $Diene_1$ is different from VCH, and contains double bonds capable of reacting with SH group of dithiol, and forming covalent C—S bonds; and wherein $R_3$ can be chosen from divalent groups containing straight chain and/or branched non-cyclic aliphatic groups, cycloaliphatic groups, aryl groups, aryl-alkyl groups, heterocyclic groups, or combinations or mixtures thereof, and wherein $R_1$, and $R_3$ can

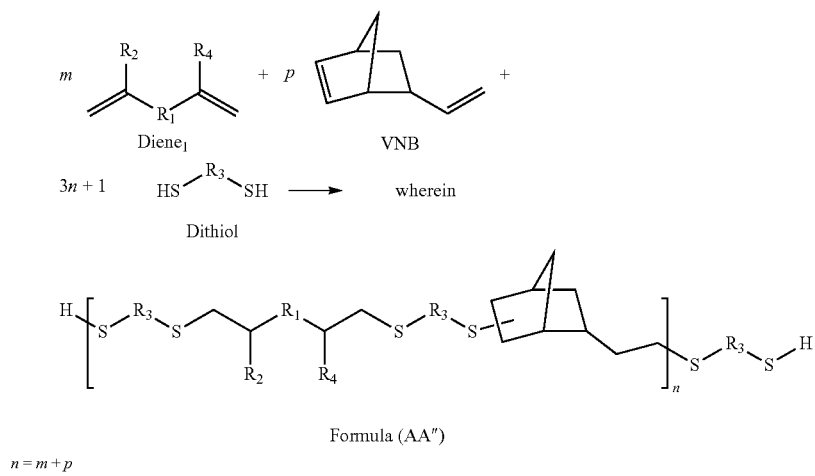

In a third non-limiting embodiment, the polythiol oligomer can be as depicted in Formula (AA''') in Scheme IV below, produced from the reaction of $Diene_1$ and 4-vinyl-1-cyclohexene (VCH) with a dithiol; wherein $R_2$ and $R_4$ can be independently chosen from H, methyl, or ethyl, and $R_1$ can be optionally contain thioether, disulfide, polysulfide, sulfone, ester, thioester, carbonate, thiocarbonate, urethane, or thiourethane linkages, or halogen substituents, or combinations thereof; and n is an integer ranging from 1 to 20.

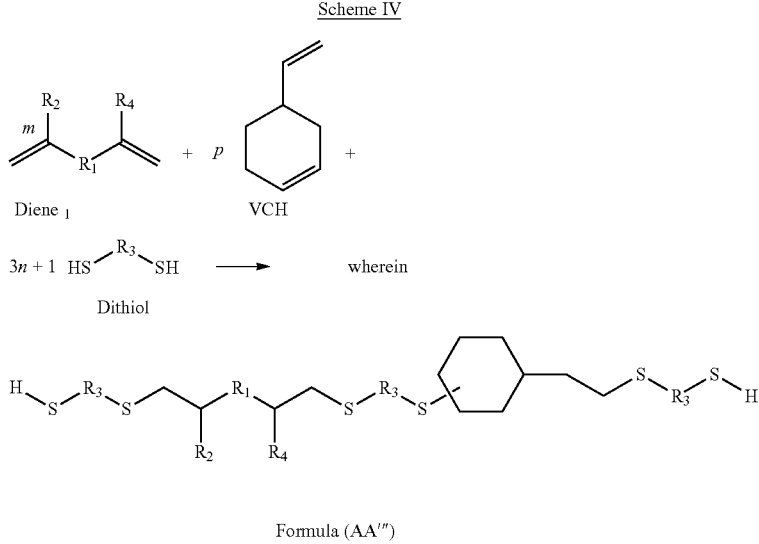

In a further non-limiting embodiment, the polythiol for use in the present invention can comprise polythiol oligomer formed by the reaction of at least two or more different dienes with at least one or more dithiol, and, optionally, one or more trifunctional or higher functional polythiol; wherein the stoichiometric ratio of the sum of the number of equivalents of all polythiols to the sum of the number of equivalents of all dienes used to prepare said polythiol oligomer is greater than 1.0:1.0.

In non-limiting embodiments, said two or more different dienes can each be independently chosen from non-cyclic dienes, including straight chain and/or branched aliphatic non-cyclic dienes; non-aromatic ring-containing dienes, including non-aromatic ring-containing dienes wherein the double bonds can be contained within the ring or not contained within the ring or any combination thereof, and wherein said non-aromatic ring-containing dienes can contain non-aromatic monocyclic groups or non-aromatic polycyclic groups or combinations thereof; aromatic ring-containing dienes; heterocyclic ring-containing dienes; or dienes containing any combination of such non-cyclic and/or cyclic groups, and wherein said two or more different dienes can optionally contain thioether, disulfide, polysulfide, sulfone, ester, thioester, carbonate, thiocarbonate, urethane, or thiourethane linkages, or halogen substituents, or combinations thereof; with the proviso that said dienes contain double bonds capable of undergoing reaction with SH groups of polythiol, and forming covalent C—S bonds, and at least two or more of said dienes are different from one another. In further non-limiting embodiments, the said one or more dithiol can each be independently chosen from dithiols containing straight chain and/or branched non-cyclic aliphatic groups, cycloaliphatic groups, aryl groups, aryl-alkyl groups, heterocyclic groups, or combinations or mixtures thereof, and wherein said one or more dithiol can each optionally contain thioether, disulfide, polysulfide, sulfone, ester, thioester, carbonate, thiocarbonate, urethane, or thiourethane linkages, or halogen substituents, or combinations thereof. In further non-limiting embodiments, the said trifunctional or higher functional polythiol can be chosen from polythiols containing non-cyclic aliphatic groups, cycloaliphatic groups, aryl groups, aryl-alkyl groups, heterocyclic groups, or combinations or mixtures thereof, and wherein said trifunctional or higher functional polythiol can each optionally contain thioether, disulfide, polysulfide, sulfone, ester, thioester, carbonate, thiocarbonate, urethane, or thiourethane linkages, or halogen substituents, or combinations thereof.

Suitable dithiols for use in preparing the polythiol oligomer can be selected from a wide variety known in the art. Non-limiting examples can include those disclosed herein. Further non-limiting examples of suitable dithiols for use in preparing the polythiol oligomer can include but are not limited to 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), 2-mercaptoethylsulfide (DMDS), methyl-substituted 2-mercaptoethylsulfide, dimethyl-substituted 2-mercaptoethylsulfide, 1,8-dimercapto-3,6-dioxaoctane and 1,5-dimercapto-3-oxapentane. In alternate non-limiting embodiments, the dithiol can be 2,5-dimercaptomethyl-1,4-dithiane, ethylene glycol di(2-mercaptoacetate), ethylene glycol di(3-mercaptopropionate), poly(ethylene glycol) di(2-mercaptoacetate), poly(ethylene glycol) di(3-mercaptopropionate), dipentene dimercaptan (DPDM), and mixtures thereof.

Suitable trifunctional and higher-functional polythiols for use in preparing the polythiol oligomer can be selected from a wide variety known in the art. Non-limiting examples can include those disclosed herein. Further non-limiting examples of suitable trifunctional and higher-functional polythiols for use in preparing the polythiol oligomer can include but are not limited to pentaerythritol tetrakis(2-mercaptoacetate), pentaerythritol tetrakis(3-mercaptopropionate), trimethylolpropane tris(2-mercaptoacetate), trimethylolpropane tris(3-mercaptopropionate), thioglycerol bis(2-mercaptoacetate), trifunctional polythiols with structures depicted in formulas (IV'i), (IV'm), (IV'p), (IV'q) disclosed herein, or mixtures thereof.

Suitable dienes for use in preparing the polythiol oligomer can vary widely and can be selected from those known in the art. Non-limiting examples of suitable dienes can include but are not limited to acyclic non-conjugated dienes, acyclic polyvinyl ethers, allyl- and vinyl-acrylates, allyl- and vinyl-methacrylates, diacrylate and dimethacrylate esters of linear diols and dithiols, diacrylate and dimethacrylate esters of poly(alkyleneglycol) diols, monocyclic aliphatic dienes, polycyclic aliphatic dienes, aromatic ring-containing dienes, diallyl and divinyl esters of aromatic ring dicarboxylic acids, and mixtures thereof.

Non-limiting examples of acyclic non-conjugated dienes can include those represented by the following general formula:

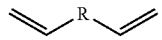

wherein R can represent $C_2$ to $C_{30}$ linear branched divalent saturated alkylene radical, or $C_2$ to $C_{30}$ divalent organic radical containing at least one element selected from the group consisting of sulfur, oxygen and silicon in addition to carbon and hydrogen atoms.

In alternate non-limiting embodiments, the acyclic non-conjugated dienes can be selected from 1,5-hexadiene, 1,6-heptadiene, 1,7-octadiene and mixtures thereof.

Non-limiting examples of suitable acyclic polyvinyl ethers can include but are not limited to those represented by structural formula (V'):

$$CH_2=CH-O-(-R^2-O-)_m-CH=CH_2 \qquad (V')$$

wherein $R^2$ can be $C_2$ to $C_6$ n-alkylene, $C_2$ to $C_6$ branched alkylene group, or $-[(CH_2-)_p-O-]_q-(-CH_2-)_r-$, m can be a rational number from 0 to 10, p can be an integer from 2 to 6, q can be an integer from 1 to 5 and r can be an integer from 2 to 10.

In a non-limiting embodiment, m can be two (2).

Non-limiting examples of suitable polyvinyl ether monomers for use can include divinyl ether monomers, such as but not limited to ethylene glycol divinyl ether, diethylene glycol divinyl ether, triethyleneglycol divinyl ether, and mixtures thereof.

Non-limiting examples of suitable allyl- and vinyl-acrylates and methacrylates can include but are not limited to those represented by the following formulas:

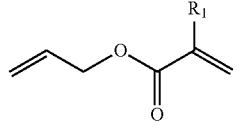

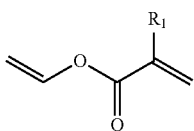

wherein $R_1$ each independently can be hydrogen or methyl.

In a non-limiting embodiment, the acrylate and methacrylate monomers can include monomers such as but not limited to allyl methacrylate, allyl acrylate and mixtures thereof.

Non-limiting examples of diacrylate and dimethacrylate esters of linear diols can include but are not limited to those represented by the following structural formula:

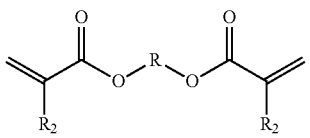

wherein R can represent $C_1$ to $C_{30}$ divalent saturated alkylene radical; branched divalent saturated alkylene radical; or $C_2$ to $C_{30}$ divalent organic radical containing at least one element selected from sulfur, oxygen and silicon in addition to carbon and hydrogen atoms; and $R_2$ can represent hydrogen or methyl.

In alternate non-limiting embodiments, the diacrylate and dimethacrylate esters of linear diols can include ethanediol dimethacrylate, 1,3-propanediol diacrylate, 1,3-propanediol dimethacrylate, 1,2-propanediol diacrylate, 1,2-propanediol dimethacrylate, 1,4-butanediol diacrylate, 1,4-butanediol dimethacrylate, 1,3-butanediol diacrylate, 1,3-butanediol dimethacrylate, 1,2-butanediol diacrylate, 1,2-butanediol dimethacrylate, and mixtures thereof.

Non-limiting examples of diacrylate and dimethacrylate esters of poly(alkyleneglycol) diols can include but are not limited to those represented by the following structural formula:

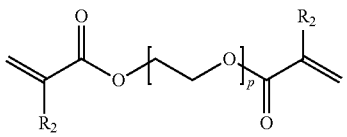

wherein $R_2$ can represent hydrogen or methyl and p can represent an integer from 1 to 5.

In alternate non-limiting embodiments, the diacrylate and dimethacrylate esters of poly(alkyleneglycol) diols can include ethylene glycol dimethacrylate, ethylene glycol diacrylate, diethylene glycol dimethacrylate, diethylene glycol diacrylate, and mixtures thereof.

Further non-limiting examples of suitable dienes can include monocyclic aliphatic dienes such as but not limited to those represented by the following structural formulas:

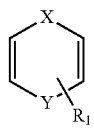

wherein X and Y each independently can represent $C_{1-10}$ divalent saturated alkylene radical; or $C_{1-5}$ divalent saturated alkylene radical, containing at least one element selected from the group of sulfur, oxygen and silicon in addition to the carbon and hydrogen atoms; and $R_1$ can represent H, or $C_1$-$C_{10}$ alkyl; and

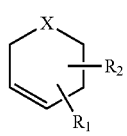

wherein X and $R_1$ can be as defined above and $R_2$ can represent $C_2$-$C_{10}$ alkenyl.

In alternate non-limiting embodiments, the monocyclic aliphatic dienes can include 1,4-cyclohexadiene, 4-vinyl-1-cyclohexene, dipentene and terpinene.

Non-limiting examples of polycyclic aliphatic dienes can include but are not limited to 5-vinyl-2-norbornene; 2,5-norbornadiene; dicyclopentadiene and mixtures thereof.

Non-limiting examples of aromatic ring-containing dienes can include but are not limited to those represented by the following structural formula:

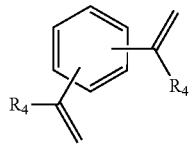

wherein $R_4$ can represent hydrogen or methyl.

In alternate non-limiting embodiments, the aromatic ring-containing dienes can include monomers such as 1,3-diisopropenyl benzene, divinyl benzene and mixtures thereof.

Non-limiting examples of diallyl esters of aromatic ring dicarboxylic acids can include but are not limited to those represented by the following structural formula:

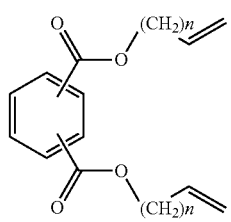

wherein m and n each independently can be an integer from 0 to 5.

In alternate non-limiting embodiments, the diallyl esters of aromatic ring dicarboxylic acids can include o-diallyl phthalate, m-diallyl phthalate, p-diallyl phthalate and mixtures thereof.

In a non-limiting embodiment, reaction of at least one polythiol with two or more different dienes can be carried out in the presence of radical initiator. Suitable free radical initiators for use in the present invention can vary widely and can include those known to one of ordinary skill in the art. Non-limiting examples of radical initiators can include but are not limited to azo or peroxide type free-radical initiators such as azobisalkalenenitriles. In a non-limiting embodiment, the free radical initiator can be azobisalkalenenitrile which is commercially available from DuPont under the trade name VAZO™. In alternate non-limiting embodiments, VAZO-52, VAZO-64, VAZO-67, VAZO-88 and mixtures thereof can be used as free radical initiators.

In a non-limiting embodiment, selection of the free-radical initiator can depend on reaction temperature. In a non-limiting embodiment, the reaction temperature can vary from room temperature to 100° C. In further alternate non-limiting embodiments, Vazo 52 can be used at a temperature of from 50-60° C., or Vazo 64 or Vazo 67 can be used at a temperature of 60° C. to 75° C., or Vazo 88 can be used at a temperature of 75-100° C.

The reaction of at least one polythiol and two or more different dienes can be carried out under a variety of reaction conditions. In alternate non-limiting embodiments, such conditions can depend on the degree of reactivity of the dienes and the desired structure of the resulting polythiol oligomer.

In a non-limiting embodiment, said at least two or more different dienes and said polythiol can be reacted together by forming a mixture of said materials and free radical initiator, and allowing said dienes and polythiol to react. In a further non-limiting embodiment, reaction of said mixture of materials can be carried out with heating of mixture. In a further non-limiting embodiment, polythiol and free radical initiator can be combined together, and resulting mixture can be added in relatively small amounts over a period of time to a mixture of two or more dienes.

In an alternate non-limiting embodiment, two or more different dienes can be reacted with polythiol in a stepwise manner under free radical initiation. In a non-limiting embodiment, a mixture of polythiol, one diene, and optionally free radical initiator can be prepared; the polythiol and diene and optionally free radical initiator can be allowed to react until double bonds are essentially consumed; and then a second diene can be added to the resulting mixture, followed by addition of free radical initiator to the mixture. The resulting mixture then is allowed to react until the double bonds are essentially consumed and a pre-calculated theoretical SH equivalent weight is obtained (e.g., calculated based upon stoichiometry and measured by titration). The reaction time for completion can vary from one hour to five days depending on the reactivity of the dienes used, and reaction temperature can vary widely, depending upn the reactivity of the dienes used and the type and amount of radical initiator that is used.

In non-limiting embodiments, polythiol oligomer can comprise random-type or block-type structure (i.e., random-type or block-type sequencing of repeat units of said polythiol oligomer).

In a non-limiting embodiment, polythiol oligomer with random-type structure; i.e., random sequencing of repeat units, can be prepared by reacting together at least two or more different dienes, polythiol, and free radical initiator. In a non-limiting embodiment, a mixture of said dienes, said polythiol, and free radical initiator can be prepared and allowed to react. In an alternate non-limiting embodiment, a mixture of said polythiol and said free radical initiator can be prepared and added over a period of time to a mixture of said dienes.

In an alternate non-limiting embodiment, polythiol oligomer with block-type structure; i.e., block-type or blocky sequencing of repeat units, can be prepared by reacting at least two or more different dienes, polythiol, and free radical initiator in a stepwise manner. In a non-limiting embodiment, a mixture of polythiol, one diene, and optionally free radical initiator can be prepared; the polythiol and diene and optionally free radical initiator can be allowed to react until double bonds are essentially consumed; and then a second diene and free radical initiator can be added to the resulting mixture; the resulting mixture then is allowed to react until the double bonds are essentially consumed and a pre-calculated theoretical SH equivalent weight is obtained.

In a non-limiting embodiment, the reaction of polythiol with at least two or more different dienes can be carried out in the presence of a catalyst. Suitable catalysts for use in the reaction can vary widely and can be selected from those known in the art. The amount of catalyst used in the reaction of the present invention can vary widely and can depend on the catalyst selected. In a non-limiting embodiment, the amount of catalyst can be present in an amount of from 0.01% by weight to 5% by weight of the reaction mixture.

In a non-limiting embodiment, wherein the mixture of dienes can include acrylic and/or methacrylic monomers, the acrylic and/or methacrylic monomers can be reacted with polythiol in the presence of a base catalyst. Suitable base catalysts for use in this reaction vary widely and can be selected from those known in the art. Non-limiting examples can include but are not limited to tertiary amine bases such as 1,8-diazabicyclo[5.4.0]undec-7-ene (DBU) and N,N-dimethylbenzylamine. The amount of base catalyst used can vary widely. In a non-limiting embodiment, the base catalyst can be present in an amount of from 0.01 to 5.0% by weight of the reaction mixture. The use of base catalyst in the reaction of the acrylic and/or methacrylic monomers with polythiol can substantially minimize or essentially preclude double bond polymerization.

In a non-limiting embodiment, in order to substantially minimize or essentially preclude double bond polymerization, acrylic and/or methacrylic double bonds can be first reacted with polythiol under basic catalysis conditions and then, electron-rich reactive double bond dienes can be added to the intermediate product and reacted under radical initiation conditions. Non-limiting examples of electron-rich reactive double bond dienes can include materials such as but not limited to vinyl ethers, aliphatic dienes and cycloaliphatic dienes.

In a non-limiting embodiment, polythiol oligomer formed by reacting acrylic and/or methacrylic dienes and polythiol in the presence of base catalyst, followed by reaction with said electron-rich dienes can have block-type copolymer structure (i.e., block-type sequencing of repeat units of said polythiol oligomer).

In an alternate non-limiting embodiment, in order to substantially minimize or essentially preclude double bond polymerization, double bonds of non-(meth)acrylic dienes can first be reacted with dithiol under free-radical initiation conditions (for example, heating in the presence of free radical initiator) and then, dienes having acrylic and/or methacrylic double bonds can be added to the intermediate product and reacted under base catalysis conditions.

In a non-limiting embodiment, polythiol oligomer formed by first reacting non(meth)acrylic dienes and polythiol under free radical initiation conditions, followed by reacting acrylic and/or methacrylic dienes under base catalysis conditions can have block-type copolymer structure (i.e., block-type sequencing of repeat units of said polythiol oligomer).

Not intending to be bound by any particular theory, it is believed that as the mixture of polythiol, dienes and radical intiator is heated, the double bonds are at least partially consumed by reaction with the SH groups of the polythiol. The mixture can be heated for a sufficient period of time such that the double bonds are essentially consumed and a pre-calculated theoretical value for SH content is reached. In a non-limiting embodiment, the mixture can be heated for a time period of from 1 hour to 5 days. In another non-limiting embodiment, the mixture can be heated at a temperature of from 40° C. to 100° C.

The number average molecular weight ($M_n$) of the resulting polythiol oligomer can vary widely. The number average molecular weight ($M_n$) of polythiol oligomer can be predicted based on the stoichiometry of the reaction. In alternate non-limiting embodiments, the $M_n$ of polythiol oligomer can vary from 400 to 10,000 g/mole, or from 1000 to 3000 g/mole.

The viscosity of the resulting polythiol oligomer can vary widely. In alternate non-limiting embodiments, the viscosity can be from 40 cP to 4000 cP at 73° C., or from 40 cP to 2000 cP at 73° C., or from 150 cP to 1500 cP at 73° C.

In a non-limiting embodiment, vinylcyclohexene (VCH) and 1,5-hexadiene (1,5-HD) can be combined together, and 2-mercaptoethylsulfide (DMDS) and a radical initiator (such as Vazo 52) can be mixed together, and this mixture can be added dropwise to the mixture of dienes at a rate such that a temperature of 60° C. is not exceeded. After the addition is completed, the mixture can be heated to maintain a temperature of 60° C. until the double bonds are essentially consumed and the pre-calculated theoretical value for SH content is reached.

In alternate non-limiting embodiments, polythiol oligomer can be prepared from the following combinations of dienes and polythiol:
  (a) 5-vinyl-2-norbornene (VNB), diethylene glycol divinyl ether (DEGVE) and DMDS;
  (b) VNB, butanediol divinylether (BDDVE), DMDS;
  (c) VNB, DEGVE, BDDVE, DMDS;
  (d) 1,3-diisopropenylbenzene (DIPEB), DEGVE and DMDS;
  (e) DIPEB, VNB and DMDS;
  (f) DIPEB, 4-vinyl-1-cyclohexene (VCH), DMDS;
  (g) allylmethacrylate (AM), VNB, and DMDS;
  (h) VCH, VNB, and DMDS;
  (i) Limonene (L), VNB and DMDS;
  (j) Ethylene glycol dimethacrylate (EGDM), VCH and DMDS;
  (k) Diallylphthalate (DAP), VNB, DMDS;
  (l) Divinylbenzene (DVB), VNB, DMDS;
  (m) DVB, VCH, DMDS; and
  (n) 1,5-HD, VCH, DMDS In an alternate non-limiting embodiment, the polythiol for use in the present invention can include polythiol oligomer formed by the reaction of at least two or more different dienes and at least one or more dithiol and, optionally, one or more trifunctional or higher functional polythiol, wherein said dienes can be selected such that at least one diene has refractive index of at least 1.52 and at least one other diene has Abbe number of at least 40, wherein said dienes contain double bonds capable of reacting with SH groups of polythiol, and forming covalent C—S bonds; and wherein the stoichiometric ratio of the sum of the number of equivalents of all polythiols present to the sum of the number of equivalents of all dienes present is greater than 1.0:1.0. In a further non-limiting embodiment, the diene with refractive index of at least 1.52 can be selected from dienes containing at least one aromatic ring, and/or dienes containing at least one sulfur-containing substituent, with the proviso that said diene has refractive index of at least 1.52; and the diene with Abbe number of at least 40 can be selected from cyclic or non-cyclic dienes not containing an aromatic ring, with the proviso that said diene has Abbe number of at least 40. In yet a further non-limiting embodiment, the diene with refractive index of at least 1.52 can be selected from diallylphthalate and 1,3-diisopropenyl benzene; and the diene with Abbe number of at least 40 can be selected from 5-vinyl-2-norbornene, 4-vinyl-1-cyclohexene, limonene, diethylene glycol divinyl ether, and allyl methacrylate.

As is known in the art, the nature of the SH group of polythiols is such that oxidative coupling can occur readily, leading to formation of disulfide linkages. Various oxidizing agents can lead to such oxidative coupling. As is also known in the art, the oxygen in the air can in some cases lead to such oxidative coupling during storage of the polythiol. As is known in the art, it is believed that a possible mechanism for the coupling of thiol groups involves the formation of thiyl radicals, followed by coupling of said thiyl radicals, to form disulfide linkage. As is known in the art, it is also believed that formation of disulfide linkage can occur under conditions that can lead to the formation of thiyl radical, including but not limited to reaction conditions involving free radical initiation.

In a non-limiting embodiment, the polythiol oligomer for use in the present invention can contain disulfide linkages present in the dithiols and/or polythiols used to prepare said polythiol oligomer. In another non-limiting embodiment, the polythiol oligomer for use in the present invention can contain disulfide linkage formed during the synthesis of said polythiol oligomer. In another non-limiting embodiment, the polythiol oligomer for use in the present invention can contain disulfide linkages formed during storage of said polythiol oligomer.

In an alternate non-limiting embodiment, the reaction mixture containing polyisocyanate and polythiol oligomer can include at least one additional active hydrogen-containing material. Active hydrogen-containing materials are varied and known in the art. Non-limiting examples can include hydroxyl-containing materials such as but not limited to polyols; sulfur-containing materials such as but not limited to hydroxyl functional polysulfides, and SH-containing materials such as but not limited to polythiols; and materials having both hydroxyl and thiol functional groups.

Suitable hydroxyl-containing materials for use in the present invention can include a wide variety of materials known in the art. Non-limiting examples can include but are not limited to polyether polyols, polyester polyols, polycaprolactone polyols, polycarbonate polyols, polyurethane polyols, poly vinyl alcohols, polymers containing hydroxy functional acrylates, polymers containing hydroxy functional methacrylates, polymers containing allyl alcohols and mixtures thereof.

Polyether polyols and methods for their preparation are known to one skilled in the art. Many polyether polyols of various types and molecular weight are commercially available from various manufacturers. Non-limiting examples of polyether polyols can include but are not limited to polyoxyalkylene polyols, and polyalkoxylated polyols. Polyoxyalkylene polyols can be prepared in accordance with known methods. In a non-limiting embodiment, a polyoxyalkylene polyol can be prepared by condensing an alkylene oxide, or a mixture of alkylene oxides, using acid- or base-catalyzed addition with a polyhydric initiator or a mixture of polyhydric initiators, such as but not limited to ethylene glycol, propylene glycol, glycerol, and sorbitol. Non-limiting examples of alkylene oxides can include ethylene oxide, propylene oxide, butylene oxide, amylene oxide, aralkylene oxides, such as but not limited to styrene oxide, mixtures of ethylene oxide and propylene oxide. In a further non-limiting embodiment, polyoxyalkylene polyols can be prepared with mixtures of alkylene oxide using random or step-wise oxyalkylation. Non-limiting examples of such polyoxyalkylene polyols include polyoxyethylene, such as but not limited to polyethylene glycol, polyoxypropylene, such as but not limited to polypropylene glycol.

In a non-limiting embodiment, polyalkoxylated polyols can be represented by the following general formula:

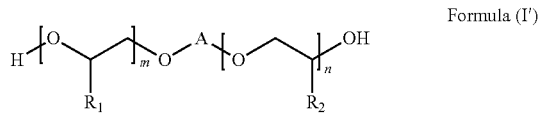

Formula (I')

wherein m and n can each be a positive integer, the sum of m and n being from 5 to 70; $R_1$ and $R_2$ are each hydrogen, methyl or ethyl; and A is a divalent linking group such as a straight or branched chain alkylene which can contain from 1 to 8 carbon atoms, phenylene, and $C_1$ to $C_9$ alkyl-substituted phenylene. The chosen values of m and n can, in combination with the chosen divalent linking group, determine the molecular weight of the polyol. Polyalkoxylated polyols can be prepared by methods that are known in the art. In a non-limiting embodiment, a polyol such as 4,4'-isopropylidenediphenol can be reacted with an oxirane-containing material such as but not limited to ethylene oxide, propylene oxide and butylene oxide, to form what is commonly referred to as an ethoxylated, propoxylated or butoxylated polyol having hydroxyl functionality. Non-limiting examples of polyols suitable for use in preparing polyalkoxylated polyols can include those polyols described in U.S. Pat. No. 6,187,444 B1 at column 10, lines 1-20, which disclosure is incorporated herein by reference.

As used herein and the claims, the term "polyether polyols" can include the generally known poly(oxytetramethylene) diols prepared by the polymerization of tetrahydrofuran in the presence of Lewis acid catalysts such as but not limited to boron trifluoride, tin (IV) chloride and sulfonyl chloride. Also included are the polyethers prepared by the copolymerization of cyclic ethers such as but not limited to ethylene oxide, propylene oxide, trimethylene oxide, and tetrahydrofuran with aliphatic diols such as but not limited to ethylene glycol, 1,3-butanediol, 1,4-butanediol, diethylene glycol, dipropylene glycol, 1,2-propylene glycol and 1,3-propylene glycol. Compatible mixtures of polyether polyols can also be used. As used herein, "compatible" means that two or more materials are mutually soluble in each other so as to essentially form a single phase.

A variety of polyester polyols for use in the present invention are known in the art. Suitable polyester polyols can include but are not limited to polyester glycols. Polyester glycols for use in the present invention can include the esterification products of one or more dicarboxylic acids having from four to ten carbon atoms, such as but not limited to adipic, succinic or sebacic acids, with one or more low molecular weight glycols having from two to ten carbon atoms, such as but not limited to ethylene glycol, propylene glycol, diethylene glycol, 1,4-butanediol, neopentyl glycol, 1,6-hexanediol and 1,10-decanediol. Esterification procedures for producing polyester polyols is described, for example, in the article D. M. Young, F. Hostettler et al., "Polyesters from Lactone," Union Carbide F-40, p. 147.

In a non-limiting embodiment, the polyol for use in the present invention can include polycaprolactone polyols. Suitable polycaprolactone polyols are varied and known in the art. In a non-limiting embodiment, polycaprolactone polyols can be prepared by condensing caprolactone in the presence of difunctional active hydrogen material such as but not limited to water or low molecular weight glycols such as but not limited to ethylene glycol and propylene glycol. Non-limiting examples of suitable polycaprolactone polyols can include commercially available materials designated as the CAPA series from Solvay Chemical which includes but is not limited to CAPA 2047A, and the TONE series from Dow Chemical such as but not limited to TONE 0201.

Polycarbonate polyols for use in the present invention are varied and known to one skilled in the art. Suitable polycarbonate polyols can include those commercially available (such as but not limited to Ravecarb™ 107 from Enichem S.p.A.). In a non-limiting embodiment, the polycarbonate polyol can be produced by reacting diol, such as described herein, and a dialkyl carbonate, such as described in U.S. Pat. No. 4,160,853. In a non-limiting embodiment, the polyol can include polyhexamethyl carbonate such as HO—$(CH_2)_6$—[O—C(O)—O—$(CH_2)_6]_n$—OH, wherein n is an integer from 4 to 24, or from 4 to 10, or from 5 to 7.

Further non-limiting examples of active hydrogen-containing materials can include low molecular weight di-functional and higher functional polyols and mixtures thereof. In a non-limiting embodiment, these low molecular weight materials can have a number average molecular weight of less than 500 grams/mole. In a further non-limiting embodiment, the amount of low molecular weight material chosen can be such to avoid a high degree of cross-linking in the polyurethane. The di-functional polyols typically contain from 2 to 16, or from 2 to 6, or from 2 to 10, carbon atoms. Non-limiting examples of such difunctional polyols can include but are not limited to ethylene glycol, propylene glycol, diethylene glycol, triethylene glycol, tetraethylene glycol, dipropylene glycol, tripropylene glycol, 1,2-, 1,3- and 1,4-butanediol, 2,2,4-trimethyl-1,3-pentanediol, 2-methyl-1,3-pentanediol, 1,3-2,4- and 1,5-pentanediol, 2,5- and 1,6-hexanediol, 2,4-heptanediol, 2-ethyl-1,3-hexanediol, 2,2-dimethyl-1,3-propanediol, 1,8-octanediol, 1,9-nonanediol, 1,10-decanediol, 1,4-cyclohexanediol, 1,4-cyclohexanedimethanol, 1,2-bis(hydroxyethyl)-cyclohexane and mixtures thereof. Non-limiting examples of trifunctional or tetrafunctional polyols can include glycerin, tetramethylolmethane, pentaerythritol, trimethylolethane, trimethylolpropane, alkoxylated polyols such as but not limited to ethoxylated trimethylolpropane, propoxylated trimethylolpropane, ethoxylated trimethylolethane; and mixtures thereof.

In a non-limiting embodiment, the active hydrogen-containing material can comprise block polymers including blocks of ethylene oxide-propylene oxide and/or ethylene oxide-butylene oxide. In a non-limiting embodiment, the active hydrogen-containing material can comprise a block copolymer of the following chemical formula:

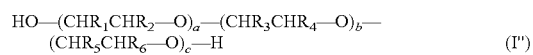

(I'')

wherein $R_1$ through $R_6$ can each independently represent hydrogen or methyl; a, b, and c can each be independently an integer from 0 to 300. wherein a, b and c are chosen such that the number average molecular weight of the polyol does not exceed 32,000 grams/mole, as determined by GPC. In a further non-limiting embodiment, a, b, and c can be chosen such that the number average molecular weight of the polyol does not exceed 10,000 grams/mole, as determined by GPC. In a non-limiting embodiment, a, b, and c can each be independently an integer from 1 to 300. In a non-limiting embodiment, $R_1$, $R_2$, $R_5$, and $R_6$ are hydrogen, and $R_3$ and $R_4$ are each independently chosen from hydrogen and methyl, with the proviso that $R_3$ and $R_4$ are different from one another. In another non-limiting embodiment, $R_3$ and $R_4$ are hydrogen, and $R_1$ and $R_2$ are each independently chosen from hydrogen and methyl, with the proviso that $R_1$ and $R_2$ are different from one another, and $R_5$ and $R_6$ are each independently chosen from hydrogen and methyl, with the proviso that $R_5$ and $R_6$ are different from one another.

In further alternate non-limiting embodiments, Pluronic R, Pluronic L62D, Tetronic R or Tetronic, which are commercially available from BASF, can be used as active hydrogen-containing material in the present invention.

In alternate non-limiting embodiments, the active hydrogen-containing material for use in the present invention can be chosen from polyether polyols, polyester polyols and polycaprolactone polyols having a number average molecular weight of at least 200 grams/mole, or at least 350 grams/mole, or at least 700 grams/mole, or at least 900 grams/mole; or less than or equal to 3,000 grams/mole, or less than or equal to 5,000 grams/mole, or less than or equal to 10,000 grams/mole, or no less than or equal to 15,000 grams/mole.

Non-limiting examples of suitable polyols for use in the present invention can include straight or branched chain alkane polyols, such as but not limited to 1,2-ethanediol, 1,3-propanediol, 1,2-propanediol, 1,4-butanediol, 1,3-butanediol, glycerol, neopentyl glycol, trimethylolethane, trimethylolpropane, di-trimethylolpropane, erythritol, pentaerythritol and di-pentaerythritol; alkoxylated polyols such as but not limited to ethoxylated trimethylolpropane, propoxylated trimethylolpropane or ethoxylated trimethylolethane; polyalkylene glycols, such as but not limited to diethylene glycol, dipropylene glycol and higher polyalkylene glycols such as but not limited to polyethylene glycols which can have number average molecular weights of from 200 grams/mole to 2,000 grams/mole; cyclic alkane polyols, such as but not limited to cyclopentanediol, cyclohexanediol, cyclohexanetriol, cyclohexanedimethanol, hydroxypropyl-cyclohexanol and cyclohexanediethanol; aromatic polyols, such as but not limited to dihydroxybenzene, benzenetriol, hydroxybenzyl alcohol and dihydroxytoluene; bisphenols, such as, 4,4'-isopropylidenediphenol; 4,4'-oxybisphenol, 4,4'-dihydroxybenzophenone, 4,4'-thiobisphenol, phenolphthlalein, bis(4-hydroxyphenyl)methane, 4,4'-(1,2-ethenediyl)bisphenol and 4,4'-sulfonylbisphenol; halogenated bisphenols, such as but not limited to 4,4'-isopropylidenebis (2,6-dibromophenol), 4,4'-isopropylidenebis(2,6-dichlorophenol) and 4,4'-isopropylidenebis(2,3,5,6-tetrachlorophenol); alkoxylated bisphenols, such as but not limited to alkoxylated 4,4'-isopropylidenediphenol which can have from 1 to 70 alkoxy groups, for example, ethoxy, propoxy, α-butoxy and β-butoxy groups; and biscyclohexanols, which can be prepared by hydrogenating the corresponding bisphenols, such as but not limited to 4,4'-isopropylidene-biscyclohexanol, 4,4'-oxybiscyclohexanol, 4,4'-thiobiscyclohexanol and bis(4-hydroxycyclohexanol)methane and mixtures thereof.

In a further non-limiting embodiment, the polyol can be a polyurethane prepolymer having two or more hydroxy functional groups. Such polyurethane prepolymers can be prepared from any of the polyols and polyisocyanates previously described herein. In a non-limiting embodiment, the OH:NCO equivalent ratio can be chosen such that essentially no free NCO groups are produced in preparing the polyurethane prepolymer. In alternate non-limiting embodiments, the equivalent ratio of OH to NCO (i.e., isocyanate) present in the polyurethane prepolymer can be an amount of from 2.0 to less than 5.5 OH/1.0 NCO.

In alternate non-limiting embodiments, the polyurethane prepolymer can have a number average molecular weight (Mn) of less than 50,000 grams/mole, or less than 20,000 grams/mole, or less than 10,000 grams/mole, or less than 5,000 grams/mole, or greater than 1,000 grams/mole or greater than 2,000 grams/mole.

In a non-limiting embodiment, the active hydrogen-containing material for use in the present invention can include sulfur-containing materials such as SH-containing materials, such as but not limited to polythiols having at least two thiol groups. Non-limiting examples of suitable polythiols can include but are not limited to aliphatic polythiols, cycloaliphatic polythiols, aromatic polythiols, heterocyclic polythiols, polymeric polythiols, oligomeric polythiols and mixtures thereof. The sulfur-containing active hydrogen-containing material can have linkages including but not limited to ether linkages (—O—), sulfide linkages (—S—), polysulfide linkages (—$S_x$—, wherein x is at least 2, or from 2 to 4) and combinations of such linkages. As used herein and the claims, the terms "thiol," "thiol group," "mercapto" or "mercapto group" refer to an —SH group which is capable of forming a thiourethane linkage, (i.e., —NH—C(O)—S—) with an isocyanate group or a dithioruethane linkage (i.e., —NH—C(S)—S—) with an isothiocyanate group.

Non-limiting examples of suitable polythiols can include but are not limited to 2,5-dimercaptomethyl-1,4-dithiane, dimercaptoethylsulfide, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, ethanedithiol, benzenedithiol, ethylene glycol di(2-mercaptoacetate), ethylene glycol di(3-mercaptopropionate), poly(ethylene glycol) di(2-mercaptoacetate) and poly(ethylene glycol) di(3-mercaptopropionate), and mixtures thereof.

In a non-limiting embodiment, the polythiol can be chosen from materials represented by the following general formula,

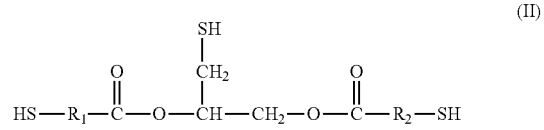

(II)

wherein $R_1$ and $R_2$ can each be independently chosen from straight or branched chain alkylene, cyclic alkylene, phenylene and $C_1$-$C_9$ alkyl substituted phenylene. Non-limiting examples of straight or branched chain alkylene can include but are not limited to methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Non-limiting examples of cyclic alkylenes can include but are not limited to cyclopentylene, cyclohexylene, cycloheptylene, cyclooctylene, and alkyl-substituted derivatives thereof. In a non-limiting embodiment, the divalent linking groups $R_1$ and $R_2$ can be chosen from phenylene and alkyl-substituted phenylene, such as methyl, ethyl, propyl, isopropyl and nonyl substituted phenylene. In a further non-limiting embodiment, $R_1$ and $R_2$ each independently can be methylene or ethylene.

The polythiol represented by general formula II can be prepared by any known method. In a non-limiting embodiment, the polythiol of formula (II) can be prepared from an esterification or transesterification reaction between 3-mercapto-1,2-propanediol (Chemical Abstract Service (CAS) Registry No. 96-27-5) and a thiol functional carboxylic acid or carboxylic acid ester in the presence of a strong acid catalyst, such as but not limited to methane sulfonic acid, with essentially concurrent removal of water or alcohol from the reaction mixture.

In a non-limiting embodiment, the polythiol represented by general formula II can be thioglycerol bis(2-mercaptoacetate). As used herein and the claims, the term "thioglycerol bis(2-mercaptoacetate)" includes all related co-products and residual starting materials. In a non-limiting embodiment, oxidative coupling of thiol groups can occur when the reaction mixture of 3-mercapto-1,2-propanediol and a thiol functional carboxylic acid such as but not limited to 2-mercaptoacetic acid, is washed with excess base such as but not limited to aqueous ammonia. Such oxidative coupling can result in the formation of oligomeric polythiol species having disulfide linkages such as but not limited to —S—S— linkages.

Non-limiting examples of a co-product oligomeric polythiol species can include materials represented by the following general formula:

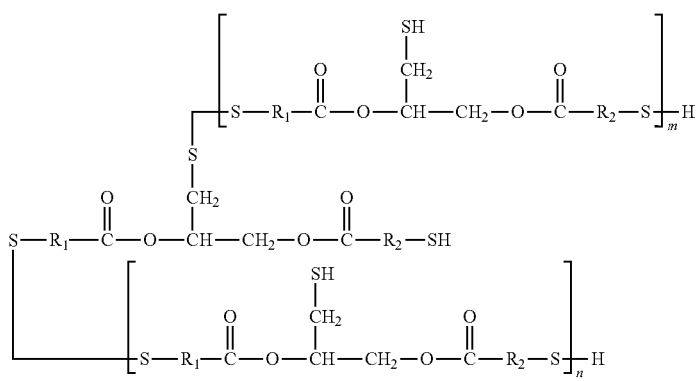

(III)

wherein $R_1$ and $R_2$ can be as described above, n and m each can be independently an integer from 0 to 21 and (n+m) can be at least 1.

In alternate non-limiting embodiments, suitable polythiols for use in the present invention can include but are not limited to polythiol oligomers having disulfide linkages, which can be prepared from the reaction of polythiol having at least two thiol groups and sulfur in the presence of basic catalyst. In a non-limiting embodiment, the equivalent ratio of polythiol monomer to sulfur can be from m to $(m^{-1})$ wherein m can represent an integer from 2 to 21. The polythiol can be chosen from those previously disclosed herein, such as but not limited to 2,5-dimercaptomethyl-1,4-dithiane. In alternate non-limiting embodiments, the sulfur can be in the form of crystalline, colloidal, powder or sublimed sulfur, and can have a purity of at least 95 percent or at least 98 percent.

In another non-limiting embodiment, the polythiol oligomer can have disulfide linkages and can include materials represented by the following general formula IV,

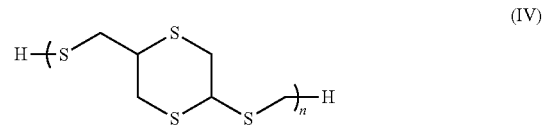

(IV)

wherein n can represent an integer from 1 to 21. In a non-limiting embodiment, the polythiol oligomer represented by general formula IV can be prepared by the reaction of 2,5-dimeracaptomethyl-1,4-dithiane with sulfur in the presence of basic catalyst, as described previously herein.

As is known in the art, the nature of the SH group of polythiols is such that oxidative coupling can occur readily, leading to formation of disulfide linkages. Various oxidizing agents can lead to such oxidative coupling. As is also known in the art, the oxygen in the air can in some cases lead to such oxidative coupling during storage of the polythiol. As is known in the art, it is believed that a possible mechanism for the coupling of thiol groups involves the formation of thiyl radicals, followed by coupling of said thiyl radicals, to form disulfide linkage. As is known in the art, it is also believed that formation of disulfide linkage can occur under conditions that can lead to the formation of thiyl radical, including but not limited to reaction conditions involving free radical initiation.

In a non-limiting embodiment, the polythiol for use in the present invention can include species containing disulfide linkage formed during storage.

In another non-limiting embodiment, the polythiol for use in the present invention can include species containing disulfide linkage formed during synthesis of said polythiol.

In a non-limiting embodiment, the polythiol for use in the present invention, can include at least one polythiol represented by the following structural formulas.

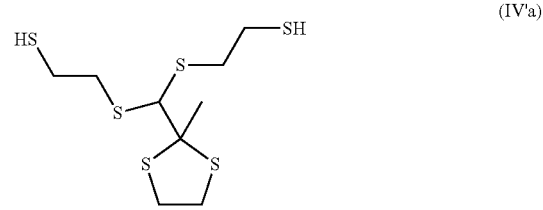

(IV'a)

-continued

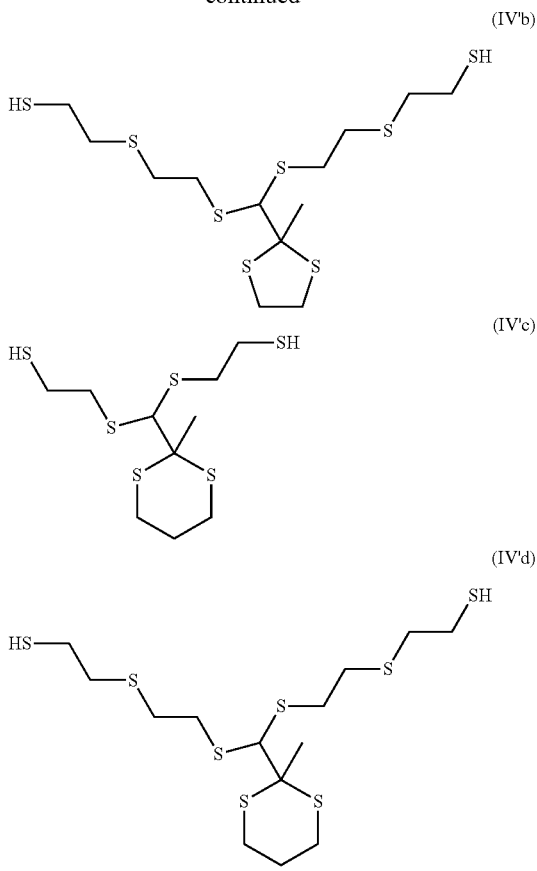

(IV'b)

(IV'c)

(IV'd)

The sulfide-containing polythiols comprising 1,3-dithiolane (e.g., formulas IV'a and b) or 1,3-dithiane (e.g., formulas IV'c and d) can be prepared by reacting asym-dichloroacetone with polymercaptan, and then reacting the reaction product with polymercaptoalkylsulfide, polymercaptan or mixtures thereof.

Non-limiting examples of suitable polymercaptans for use in the reaction with asym-dichloroacetone can include but are not limited to materials represented by the following formula,

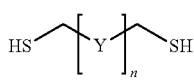

1 wherein Y can represent $CH_2$ or $(CH_2-S-CH_2)$, and n can be an integer from 0.0 to 5. In a non-limiting embodiment, the polymercaptan for reaction with asym-dichloroacetone in the present invention can be chosen from ethanedithiol, propanedithiol, and mixtures thereof.

The amount of asym-dichloroacetone and polymercaptan suitable for carrying out the above reaction can vary. In a non-limiting embodiment, asym-dichloroacetone and polymercaptan can be present in the reaction mixture in an amount such that the molar ratio of dichloroacetone to polymercaptan can be from 1:1 to 1:10.

Suitable temperatures for reacting asym-dichloroacetone with polymercaptan can vary. In a non-limiting embodiment, the reaction of asym-dichloroacetone with polymercaptan can be carried out at a temperature within the range of from 0 to 100° C.

Non-limiting examples of suitable polymercaptans for use in the reaction with the reaction product of the asym-dichloroacetone and polymercaptan, can include but are not limited to materials represented by the above general formula 1, aromatic polymercaptans, cycloalkyl polymercaptans, heterocyclic polymercaptans, branched polymercaptans, and mixtures thereof.

Non-limiting examples of suitable polymercaptoalkylsulfides for use in the reaction with the reaction product of the asym-dichloroacetone and polymercaptan, can include but are not limited to materials represented by the following formula,

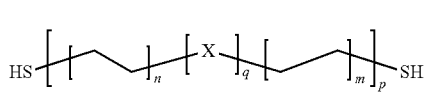

2 wherein X can represent O, S or Se, n can be an integer from 0 to 10, m can be an integer from 0 to 10, p can be an integer from 1 to 10, q can be an integer from 0 to 3, and with the proviso that (m+n) is an integer from 1 to 20.

Non-limiting examples of suitable polymercaptoalkylsulfides for use in the present invention can include branched polymercaptoalkylsulfides.

In a non-limiting embodiment, the polymercaptoalkylsulfide for use in the present invention can be dimercaptoethylsulfide.

The amount of polymercaptan, polymercaptoalkylsulfide, or mixtures thereof, suitable for reacting with the reaction product of asym-dichloroacetone and polymercaptan, can vary. In a non-limiting embodiment, polymercaptan, polymercaptoalkylsulfide, or a mixture thereof, can be present in the reaction mixture in an amount such that the equivalent ratio of reaction product to polymercaptan, polymercaptoalkylsulfide, or a mixture thereof, can be from 1:1.01 to 1:2. Moreover, suitable temperatures for carrying out this reaction can vary. In a non-limiting embodiment, the reaction of polymercaptan, polymercaptoalkylsulfide, or a mixture thereof, with the reaction product can be carried out at a temperature within the range of from 0 to 100° C.

In a non-limiting embodiment, the reaction of asym-dichloroacetone with polymercaptan can be carried out in the presence of acid catalyst. The acid catalyst can be selected from a wide variety known in the art, such as but not limited to Lewis acids and Bronsted acids. Non-limiting examples of suitable acid catalysts can include those described in Ullmann's Encyclopedia of Industrial Chemistry, 5$^{th}$ Edition, 1992, Volume A21, pp. 673 to 674. In further alternate non-limiting embodiments, the acid catalyst can be chosen from boron trifluoride etherate, hydrogen chloride, toluenesulfonic acid, and mixtures thereof.

The amount of acid catalyst can vary. In a non-limiting embodiment, a suitable amount of acid catalyst can be from 0.01 to 10 percent by weight of the reaction mixture.

In another non-limiting embodiment, the reaction product of asym-dichloroacetone and polymercaptan can be reacted with polymercaptoalkylsulfide, polymercaptan or mixtures thereof, in the presence of base. The base can be selected from a wide variety known in the art, such as but not limited to Lewis bases and Bronsted bases. Non-limiting examples of suitable bases can include those described in Ullmann's Encyclopedia of Industrial Chemistry, 5$^{th}$ Edition, 1992, Volume A21, pp. 673 to 674. In a further non-limiting embodiment, the base can be sodium hydroxide.

The amount of base can vary. In a non-limiting embodiment, a suitable equivalent ratio of base to reaction product of the first reaction, can be from 1:1 to 10:1.

In another non-limiting embodiment, the preparation of these sulfide-containing polythiols can include the use of a solvent. The solvent can be selected from a wide variety known in the art.

In a further non-limiting embodiment, the reaction of asym-dichloroacetone with polymercaptan can be carried out in the presence of a solvent. The solvent can be selected from a wide variety of known materials. In a non-limiting embodiment, the solvent can be selected from but is not limited to organic solvents, including organic inert solvents. Non-limiting examples of suitable solvents can include but are not limited to chloroform, dichloromethane, 1,2-dichloroethane, diethyl ether, benzene, toluene, acetic acid and mixtures thereof. In still a further embodiment, the reaction of asym-dichloroacetone with polymercaptan can be carried out in the presence of toluene as solvent.

In another embodiment, the reaction product of asym-dichloroacetone and polymercaptan can be reacted with polymercaptoalkylsulfide, polymercaptan or mixtures thereof, in the presence of a solvent, wherein the solvent can be selected from but is not limited to organic solvents including organic inert solvents. Non-limiting examples of suitable organic and inert solvents can include alcohols such as but not limited to methanol, ethanol and propanol; aromatic hydrocarbon solvents such as but not limited to benzene, toluene, xylene; ketones such as but not limited to methyl ethyl ketone; water and mixtures thereof. In a further non-limiting embodiment, this reaction can be carried out in the presence of a mixture of toluene and water as solvent. In another non-limiting embodiment, this reaction can be carried out in the presence of ethanol as solvent.

The amount of solvent can widely vary. In a non-limiting embodiment, a suitable amount of solvent can be from 0 to 99 percent by weight of the reaction mixture. In a further non-limiting embodiment, the reaction can be carried out neat, i.e., without solvent.

In another non-limiting embodiment, the reaction of asym-dichloroacetone with polyercaptan can be carried out in the presence of dehydrating reagent. The dehydrating reagent can be selected from a wide variety known in the art. Suitable dehydrating reagents for use in this reaction can include but are not limited to magnesium sulfate. The amount of dehydrating reagent can vary widely according to the stoichiometry of the dehydrating reaction.

In a non-limiting embodiment, sulfide-containing polythiol of the present invention can be prepared by reacting 1,1-dichloroacetone with 1,2-ethanedithiol to produce 2-methyl-2-dichloromethyl-1,3-dithiolane, as shown below.

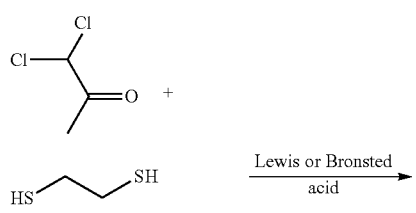

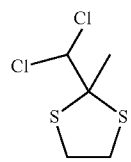

In a further non-limiting embodiment, 1,1-dichloroacetone can be reacted with 1,3-propanedithiol to produce 2-methyl-2-dichloromethyl-1,3-dithiane, as shown below.

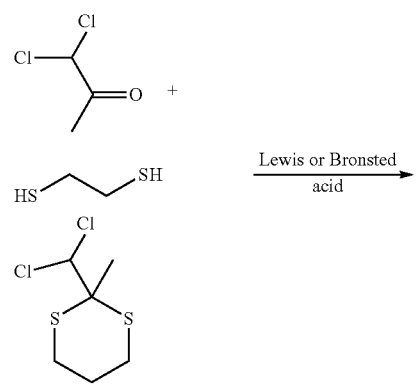

In another non-limiting embodiment, 2-methyl-2-dichloromethyl-1,3-dithiolane can be reacted with dimercaptoethylsulfide to produce dimercapto 1,3-dithiolane derivative of the present invention, as shown below.

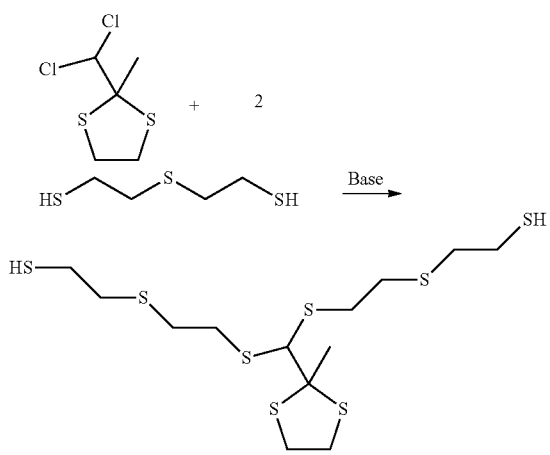

In another non-limiting embodiment, 2-methyl-2-dichloromethyl-1,3-dithiolane can be reacted with 1,2-ethanedithiol to produce dimercapto 1,3-dithiolane derivative of the present invention, as shown below.

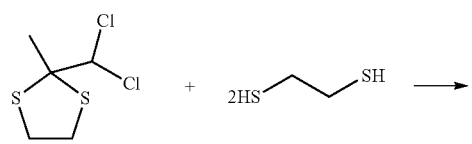

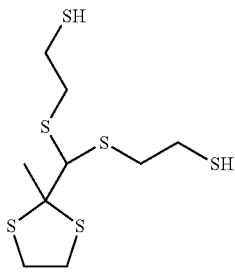

In another non-limiting embodiment, 2-methyl-2-dichloromethyl-1,3-dithiane can be reacted with dimercaptoethylsulfide to produce dimercapto 1,3-dithiane derivative of the present invention as shown below.

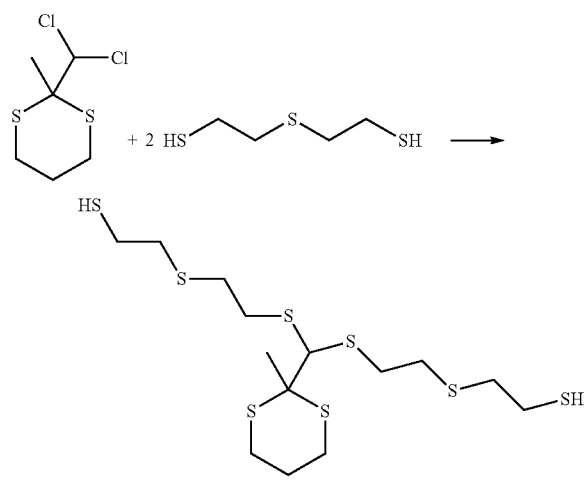

In another non-limiting embodiment, 2-methyl-2-dichloromethyl-1,3-dithiane can be reacted with 1,2-ethanedithiol to produce dimercapto 1,3-dithiane derivative of the present invention as shown below.

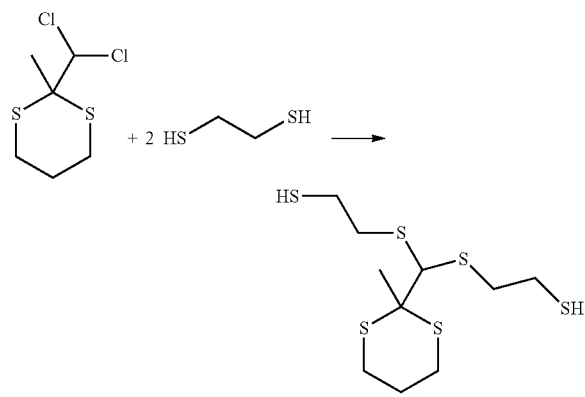

In another non-limiting embodiment, the polythiol for use in the present invention can include at least one oligomeric polythiol prepared by reacting asym-dichloro derivative with polymercaptoalkylsulfide as follows.

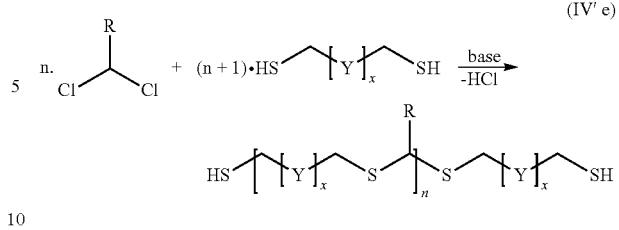

wherein R can represent $CH_3$, $CH_3CO$, $C_1$ to $C_{10}$ alkyl, $C_3$-$C_{14}$ cycloalkyl, $C_6$-$C_{14}$ aryl alkyl, or $C_1$-$C_{10}$ alkyl-CO; Y can represent $C_1$ to $C_{10}$ alkyl, $C_3$-$C_{14}$ cycloalkyl, $C_6$ to $C_{14}$ aryl, $(CH_2)_p(S)_m(CH_2)_q$, $(CH_2)_p(Se)_m(CH_2)_q$, $(CH_2)_p(Te)_m(CH_2)_q$ wherein m can be an integer from 1 to 5 and, p and q can each independently be an integer from 1 to 10; n can be an integer from 1 to 20; and x can be an integer from 0 to 10.

In a further non-limiting embodiment, polythioether oligomeric dithiol can be prepared by reacting asym-dichloroacetone with polymercaptoalkylsulfide in the presence of base. Non-limiting examples of suitable polymercaptoalkylsulfides for use in this reaction can include but are not limited to those materials represented by general formula 2 as previously recited herein. Suitable bases for use in this reaction can include those previously recited herein.

Further non-limiting examples of suitable polymercaptoalkylsulfides for use in the present invention can include branched polymercaptoalkylsulfides. In a non-limiting embodiment, the polymercaptoalkylsulfide can be dimercaptoethylsulfide.

In a non-limiting embodiment, the reaction of asym-dichloro derivative with polymercaptoalkylsulfide can be carried out in the presence of base. Non-limiting examples of suitable bases can include those previously recited herein.

In another non-limiting embodiment, the reaction of asym-dichloro derivative with polymercaptoalkylsulfide can be carried out in the presence of phase transfer catalyst. Suitable phase transfer catalysts for use in the present invention are known and varied. Non-limiting examples can include but are not limited to tetraalkylammonium salts and tetraalkylphosphonium salts. In a further non-limiting embodiment, this reaction can be carried out in the presence of tetrabutylphosphonium bromide as phase transfer catalyst. The amount of phase transfer catalyst can vary widely. In alternate non-limiting embodiments, the amount of phase transfer catalyst to polymercaptosulfide reactants can be from 0 to 50 equivalent percent, or from 0 to 10 equivalent percent, or from 0 to 5 equivalent percent.

In another non-limiting embodiment, the preparation of polythioether oligomeric dithiol can include the use of solvent. Non-limiting examples of suitable solvents can include but are not limited to those previously recited herein.

In a non-limiting embodiment, "n" moles of 1,1-dichloroacetone can be reacted with "n+1" moles of polymercaptoethylsulfide wherein n can represent an integer of from 1 to 20, to produce polythioether oligomeric dithiol as follows.

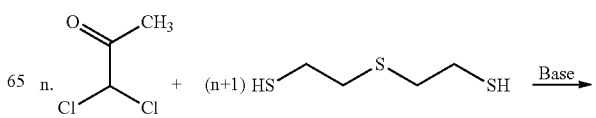

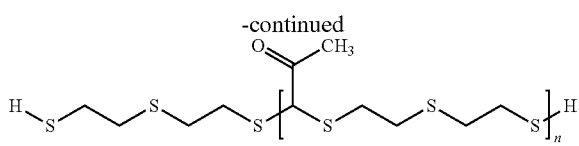

In a further non-limiting embodiment, polythioether oligomeric dithiol of the present invention can be prepared by introducing "n" moles of 1,1-dichloroethane and "n+1" moles of polymercaptoethylsulfide as follows:

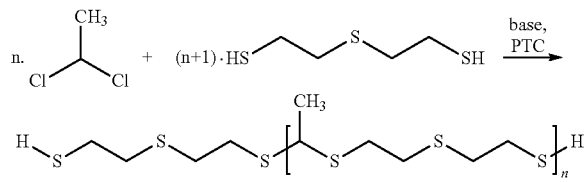

wherein n can represent an integer from 1 to 20.

In a non-limiting embodiment, polythiol for use in the present invention can include polythiol oligomer formed by the reaction of dithiol with diene, via the thiol-ene type reaction of the SH groups of said dithiol with double bond groups of said diene.

In a non-limiting embodiment, polythiol for use in the present invention can include at least one oligomeric polythiol as follows:

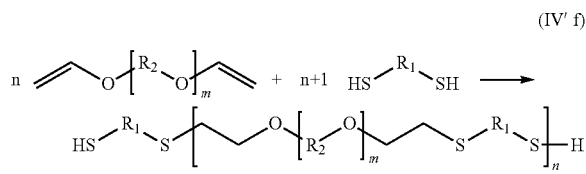

(IV' f)

wherein $R_1$ can be selected from $C_2$ to $C_6$ n-alkylene; $C_3$ to $C_6$ alkylene unsubstituted or substituted wherein substituents can be hydroxyl, methyl, ethyl, methoxy or ethoxy; or $C_6$ to $C_8$ cycloalkylene; $R_2$ can be selected from $C_2$ to $C_6$ n-alkylene, $C_2$ to $C_6$ branched alkylene, $C_6$ to $C_8$ cycloalkylene, $C_6$ to $C_{10}$ alkylcycloalkylene or —[(CH$_2$—)$_p$—O—]$_q$—(—CH$_2$—)$_r$—; m can be a rational number from 0 to 10, n can be an integer from 1 to 20, p can be an integer from 2 to 6, q can be an integer from 1 to 5, and r can be an integer from 2 to 10.

Various methods of preparing the polythiol of formula (IV'f) are described in detail in U.S. Pat. No. 6,509,418B1, column 4, line 52 through column 8, line 25, which disclosure is herein incorporated by reference. In general, this polythiol can be prepared by combining reactants comprising one or more polyvinyl ether monomer, and one or more polythiol. Useful polyvinyl ether monomers can include but are not limited to divinyl ethers represented by structural formula (V'):

$$CH_2=CH-O-(-R_2-O-)_m-CH=CH_2 \qquad (V')$$

wherein $R_2$ can be selected from $C_2$ to $C_6$ n-alkylene, $C_2$ to $C_6$ branched alkylene, $C_6$ to $C_8$ cycloalkylene, $C_6$ to $C_{10}$ alkylcycloalkylene or —[(CH$_2$—)$_p$—O—]$_q$—(—CH$_2$—)$_r$—, m is a rational number ranging from 0 to 10, p is an integer from 2 to 6, q is an integer from 1 to 5 and r is an integer from 2 to 10.

In a non-limiting embodiment, m can be two (2).

Non-limiting examples of suitable polyvinyl ether monomers for use can include divinyl ether monomers, such as but not limited to ethylene glycol divinyl ether, diethylene glycol divinyl ether, butane diol divinyl ether and mixtures thereof.

In alternate non-limiting embodiments, the polyvinyl ether monomer can constitute from 10 to less than 50 mole percent of the reactants used to prepare the polythiol, or from 30 to less than 50 mole percent.

The divinyl ether of formula (V') can be reacted with polythiol such as but not limited to dithiol represented by the formula (VI'):

$$HS-R_1-SH \qquad (VI')$$

wherein $R_1$ can be selected from $C_2$ to $C_6$ n-alkylene group; $C_3$ to $C_6$ branched alkylene group, having one or more pendant groups which can include but are not limited to hydroxyl, alkyl such as methyl or ethyl; alkoxy, or $C_6$ to $C_8$ cycloalkylene.

Further non-limiting examples of suitable polythiols for reaction with Formula (V') can include those polythiols represented by Formula 2 herein.

Non-limiting examples of suitable polythiols for reaction with Formula (V') can include but are not limited to dithiols such as 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide (DMDS), methyl-substituted dimercaptodiethylsulfide, dimethyl-substituted dimercaptodiethylsulfide, dimercaptodioxaoctane, 1,5-dimercapto-3-oxapentane and mixtures thereof.

In a non-limiting embodiment, the polythiol for reaction with Formula (V') can have a number average molecular weight ranging from 90 to 1000 grams/mole, or from 90 to 500 grams/mole. In a further non-limiting embodiment, the stoichiometric ratio of polythiol to divinyl ether can be less than one equivalent of polyvinyl ether to one equivalent of polythiol.

In a non-limiting embodiment, the polythiol and divinyl ether mixture can further include one or more free radical initiators. Non-limiting examples of suitable free radical initiators can include azo compounds, such as azobis-nitrile compounds such as but not limited to azo(bis)isobutyronitrile (AIBN); organic peroxides such as but not limited to benzoyl peroxide and t-butyl peroxide; inorganic peroxides and similar free-radical generators.

In alternate non-limiting embodiments, the reaction to produce the material represented by Formula (IV'f) can include irradiation with ultraviolet light either with or without a photoinitiator.

In a non-limiting embodiment, the polythiol for use in the present invention can include material represented by the following structural formula and prepared by the following reaction:

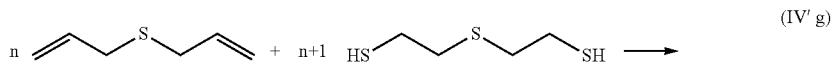

(IV' g)

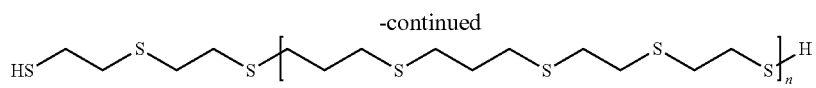

wherein n can be an integer from 1 to 20.

Various methods of preparing the polythiol of formula (IV'g) are described in detail in WO 03/042270, page 2, line 16 to page 10, line 7, which disclosure is incorporated herein by reference. In general, the polythiol can have number average molecular weight of from 100 to 3000 grams/mole. The polythiol can be prepared by ultraviolet (UV) initiated free radical polymerization in the presence of suitable photoinitiator. Suitable photoinitiators in usual amounts as known to one skilled in the art can be used for this process. In a non-limiting embodiment, 1-hydroxycyclohexyl phenyl ketone (Irgacure 184) can be used in an amount of from 0.05% to 0.10% by weight, based on the total weight of the polymerizable monomers in the mixture.

In a non-limiting embodiment, the polythiol represented by formula (IV'g) can be prepared by reacting "n" moles of allyl sulfide and "n+1" moles of dimercaptodiethylsulfide as shown above.

In a non-limiting embodiment, the polythiol for use in the present invention can include a material represented by the following structural formula and prepared by the following reaction:

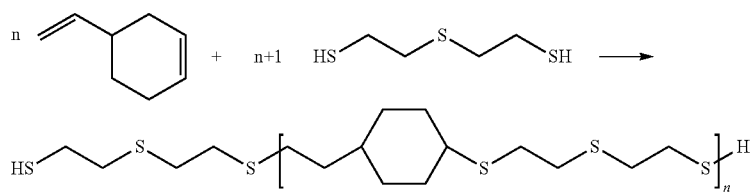

wherein n can be an integer from 1 to 20.

Various methods for preparing the polythiol of formula (IV'h) are described in detail in WO/01/66623A1, from page 3, line 19 to page 6, line 11, the disclosure of which is incorporated herein by reference. In general, polythiols can be prepared by reaction of thiol such as dithiol, and aliphatic, ring-containing non-conjugated diene in the presence of radical initiator. Non-limiting examples of suitable thiols can include but are not limited to lower alkylene thiols such as ethanedithiol, vinylcyclohexyldithiol, dicyclopentadienedithiol, dipentene dimercaptan, and hexanedithiol; polyol esters of thioglycolic acid and thiopropionic acid; and mixtures thereof and mixtures thereof.

Non-limiting examples of suitable cyclodienes can include but are not limited to vinylcyclohexene, dipentene, dicyclopentadiene, cyclododecadiene, cyclooctadiene, 2-cyclopenten-1-yl-ether, 5-vinyl-2-norbornene and norbornadiene.

Non-limiting examples of suitable radical initiators for the reaction can include azo or peroxide free radical initiators such as azobisalkylenenitrile which is commercially available from DuPont under the trade name VAZO™.

In a further non-limiting embodiment, "n+1" moles of dimercaptoethylsulfide can be reacted with "n" moles of 4-vinyl-1-cyclohexene, as shown above, in the presence of VAZO-52 radical initiator.

In a non-limiting embodiment, the polythiol for use in the present invention can include a material represented by the following structural formula and reaction scheme:

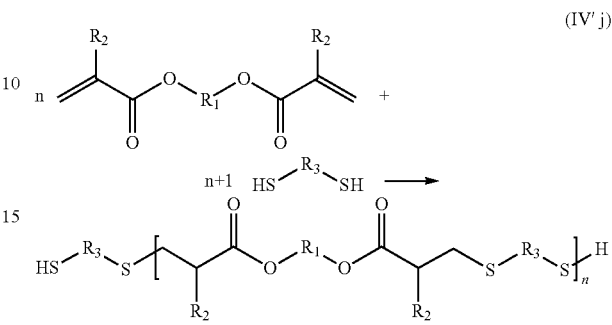

wherein $R_1$ and $R_3$ can each be independently selected from $C_1$ to $C_6$ n-alkylene, $C_2$ to $C_6$ branched alkylene, $C_6$ to $C_8$ cycloalkylene, $C_6$ to $C_{10}$ alkylcycloalkylene, $C_6$ to $C_8$ aryl, $C_6$ to $C_{10}$ alkyl-aryl, $C_1$-$C_{10}$ alkyl containing ether linkages or thioether linkages or ester linkages or thioester linkages or combinations thereof, $-[(CH_2-)_p-X-]_q-(-CH_2-)_r-$, wherein X can be O or S, p can be an integer from 2 to 6, q can be an integer from 1 to 5, r can be an integer from 0 to 10; $R_2$ can be selected from hydrogen or methyl; and n can be an integer from 1 to 20.

In general, the polythiol of formula (IV'j) can be prepared by reacting di(meth)acrylate monomer and one or more polythiols. Non-limiting examples of suitable di(meth)acrylate monomers can vary widely and can include those known in the art, such as but not limited to ethylene glycol di(meth (acrylate, 1,3-butylene glycol di(meth)acrylate, 1,4-butanediol di(meth)acrylate, 2,3-dimethylpropane 1,3-di(meth) acrylate, 1,6-hexanediol di(meth)acrylate, propylene glcol di(meth)acrylate, dipropylene glycol di(meth)acrylate, tripropylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth) acrylate, hexylene glycol di(meth)acrylate, diethylene glycol di(meth)acrylate, polyethylene glycol di(meth)acrylate, polybutadiene di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxyolated neopentyl glycol di(meth) acrylate, pentanediol di(meth)acrylate, cyclohexane dimethanol di(meth)acrylate, ethoxylated bis-phenol A di(meth)acrylate.

Non-limiting examples of suitable polythiols for use as reactants in preparing polythiol of Formula (IV'j) can vary widely and can include those known in the art, such as but not limited to 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide (DMDS), methyl-substituted dimercaptodiethylsulfide, dimethyl-substituted dimercaptodiethylsulfide, dimercaptodioxaoctane, 3,6-dioxa,1,8-octanedithiol, 2-mercaptoethyl ether, 1,5-dimercapto-3-oxapentane, 2,5-dimercaptomethyl-1,4-dithiane (DMMD), ethylene glycol di(2-mercaptoacetate), ethylene glycol di(3-mercaptopropionate), and mixtures thereof.

In a non-limiting embodiment, the di(meth)acrylate used to prepare the polythiol of formula (IV'j) can be ethylene glycol di(meth)acrylate.

In another non-limiting embodiment, the polythiol used to prepare the polythiol of formula (IV'j) can be dimercaptodiethylsulfide (DMDS).

In a non-limiting embodiment, the reaction to produce the polythiol of formula (IV'j) can be carried out in the presence of base catalyst. Suitable base catalysts for use in this reaction can vary widely and can be selected from those known in the art. Non-limiting examples can include but are not limited to tertiary amine bases such as 1,8-diazabicyclo[5.4.0]undec-7-ene (DBU) and N,N-dimethylbenzylamine. The amount of base catalyst used can vary widely. In a non-limiting embodiment, base catalyst can be present in an amount of from 0.001 to 5.0% by weight of the reaction mixture.

Not intending to be bound by any particular theory, it is believed that as the mixture of polythiol, di(meth)acrylate monomer, and base catalyst is reacted, the double bonds can be at least partially consumed by reaction with the SH groups of the polythiol.

In a non-limiting embodiment, the mixture can be reacted for a period of time such that the double bonds are substantially consumed and a pre-calculated theoretical value for SH content is achieved. In a non-limiting embodiment, the mixture can be reacted for a time period of from 1 hour to 5 days. In another non-limiting embodiment, the mixture can be reacted at a temperature of from 20° C. to 100° C. In a further non-limiting embodiment, the mixture can be reacted until a theoretical value for SH content of from 0.5% to 20% is achieved.

The number average molecular weight ($M_n$) of the resulting polythiol can vary widely. In a non-limiting embodiment, the number average molecular weight ($M_n$) of polythiol can be determined by the stoichiometry of the reaction. In alternate non-limiting embodiments, the $M_n$ of polythiol can be at least 400 g/mole, or less than or equal to 5000 g/mole, or from 1000 to 3000 g/mole.

In a non-limiting embodiment, the polythiol for use in the present invention can include a material represented by the following structural formula and reaction scheme:

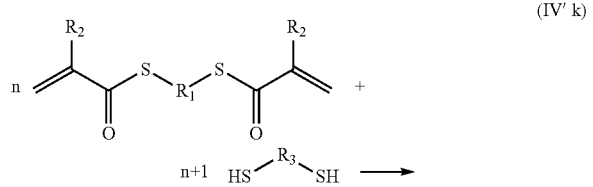

(IV' k)

-continued

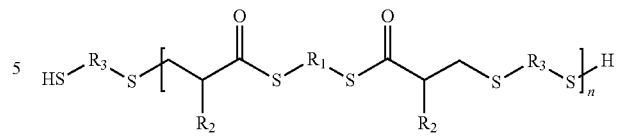

wherein $R_1$ and $R_3$ each can be independently selected from $C_1$ to $C_6$ n-alkylene, $C_2$ to $C_6$ branched alkylene, $C_6$ to $C_8$ cycloalkylene, $C_6$ to $C_{10}$ alkylcycloalkylene, $C_6$ to $C_8$ aryl, $C_6$ to $C_{10}$ alkyl-aryl, $C_1$-$C_{10}$ alkyl containing ether linkages or thioether linkages or ester linkages or thioester linkages or combinations thereof, —[(CH$_2$—)$_p$—X—]$_q$— (—CH$_2$—)$_r$—, wherein X can be O or S, p can be an integer from 2 to 6, q can be an integer from 1 to 5, r can be an integer from 0 to 10; $R_2$ can be selected from hydrogen or methyl, and n can be an integer from 1 to 20.

In general, the polythiol of formula (IV'k) can be prepared by reacting polythio(meth)acrylate monomer, and one or more polythiols. Non-limiting examples of suitable polythio (meth)acrylate monomers can vary widely and can include those known in the art such as but not limited to di(meth) acrylate of 1,2-ethanedithiol including oligomers thereof, di(meth)acrylate of dimercaptodiethyl sulfide (i.e., 2,2'-thioethanedithiol di(meth)acrylate) including oligomers thereof, di(meth)acrylate of 3,6-dioxa-1,8-octanedithiol including oligomers thereof, di(meth)acrylate of 2-mercaptoethyl ether including oligomers thereof, di(meth)acrylate of 4,4'-thiodibenzenethiol, and mixtures thereof.

The polythio(meth)acrylate monomer can be prepared from polythiol using methods known to those skilled in the art, including but not limited to those methods disclosed in U.S. Pat. No. 4,810,812, U.S. Pat. No. 6,342,571; and WO 03/011925. Non-limiting examples of suitable polythiol for use as reactant(s) in preparing polythiols can include a wide variety of polythiols known in the art, such as but not limited to 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 3,6-dioxa, 1,8-octanedithiol, 2-mercaptoethyl ether, 1,5-dimercapto-3-oxapentane, 2,5-dimercaptomethyl-1,4-dithiane (DMMD), ethylene glycol di(2-mercaptoacetate), ethylene glycol di(3-mercaptopropionate), and mixtures thereof.

In a non-limiting embodiment, the polythio(meth)acrylate used to prepare the polythiol of formula (IV'k) can be di(meth)acrylate of dimercaptodiethylsulfide, i.e., 2,2'-thiodiethanethiol dimethacrylate. In another non-limiting embodiment, the polythiol used to prepare the polythiol of formula (IV'k) can be dimercaptodiethylsulfide (DMDS).

In a non-limiting embodiment, this reaction can be carried out in the presence of base catalyst. Non-limiting examples of suitable base catalysts for use can vary widely and can be selected from those known in the art. Non-limiting examples can include but are not limited to tertiary amine bases such as 1,8-diazabicyclo[5.4.0]undec-7-ene (DBU) and N,N-dimethylbenzylamine.

The amount of base catalyst used can vary widely. In a non-limiting embodiment, the base catalyst can be present in an amount of from 0.001 to 5.0% by weight of the reaction mixture. In a non-limiting embodiment, the mixture can be reacted for a time period of from 1 hour to 5 days. In another non-limiting embodiment, the mixture can be reacted at a temperature of from 20° C. to 100° C. In a further non-limiting embodiment, the mixture can be heated until a pre-calculated theoretical value for SH content of from 0.5% to 20% is achieved.

The number average molecular weight ($M_n$) of the resulting polythiol can vary widely. In a non-limiting embodiment, the number average molecular weight ($M_n$) of polythiol can be determined by the stoichiometry of the reaction. In alternate non-limiting embodiments, the $M_n$ of polythiol can be at least 400 g/mole, or less than or equal to 5000 g/mole, or from 1000 to 3000 g/mole.

In a non-limiting embodiment, the polythiol for use in the present invention can include a material represented by the following structural formula and reaction:

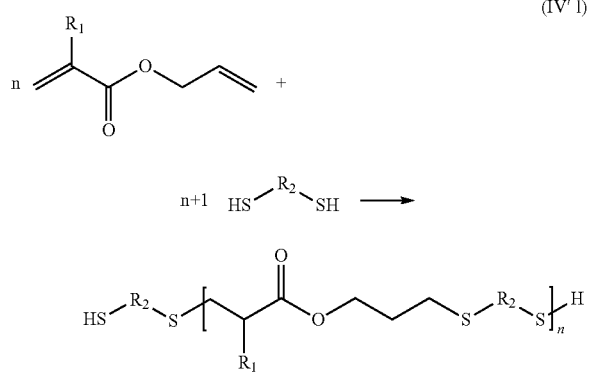

(IV′l)

wherein $R_1$ can be selected from hydrogen or methyl, and $R_2$ can be selected from $C_1$ to $C_6$ n-alkylene, $C_2$ to $C_6$ branched alkylene, $C_6$ to $C_8$ cycloalkylene, $C_6$ to $C_{10}$ alkylcycloalkylene, $C_6$ to $C_8$ aryl, $C_6$ to $C_{10}$ alkyl-aryl, $C_1$-$C_{10}$ alkyl containing ether linkages or thioether linkages or ester linkages or thioester linkages or combinations thereof, or —[(CH$_2$—)$_p$—X—]$_q$—(—CH$_2$—)$_r$—, wherein X can be selected from O or S, p can be an integer from 2 to 6, q can be an integer from 1 to 5, r can be an integer from 0 to 10; and n can be an integer from 1 to 20.

In general, the polythiol of formula (IV′l) can be prepared by reacting allyl(meth)acrylate, and one or more polythiols.

Non-limiting examples of suitable polythiols for use as reactant(s) in preparing polythiol of formula (IV′l) can include a wide variety of known polythiols such as but not limited to 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 3,6-dioxa, 1,8-octanedithiol, 2-mercaptoethyl ether, 1,5-dimercapto-3-oxapentane, 2,5-dimercaptomethyl-1,4-dithiane, ethylene glycol di(2-mercaptoacetate), ethylene glycol di(3-mercaptopropionate), and mixtures thereof.

In a non-limiting embodiment, the polythiol used to prepare the polythiol of formula (IV′l) can be dimercaptodiethylsulfide (DMDS).

In a non-limiting embodiment, the (meth)acrylic double bonds of allyl(meth)acrylate can be first reacted with polythiol in the presence of base catalyst. Non-limiting examples of suitable base catalysts can vary widely and can be selected from those known in the art. Non-limiting examples can include but are not limited to tertiary amine bases such as 1,8-diazabicyclo[5.4.0]undec-7-ene (DBU) and N,N-dimethylbenzylamine. The amount of base catalyst used can vary widely. In a non-limiting embodiment, base catalyst can be present in an amount of from 0.001 to 5.0% by weight of the reaction mixture. In a non-limiting embodiment, the mixture can be reacted for a time period of from 1 hour to 5 days. In another non-limiting embodiment, the mixture can be reacted at a temperature of from 20° C. to 100° C. In a further non-limiting embodiment, following the reaction of the SH groups of the polythiol with substantially all of the available (meth)acrylate double bonds of the allyl (meth)acrylate, the allyl double bonds can then be reacted with the remaining SH groups in the presence of radical initiator.

Not intending to be bound by any particular theory, it is believed that as the mixture is heated, the allyl double bonds can be at least partially consumed by reaction with the remaining SH groups. Non-limiting examples of suitable radical initiators can include but are not limited to azo or peroxide type free-radical initiators such as azobisalkylenenitriles. In a non-limiting embodiment, the free-radical initiator can be azobisalkylenenitrile which is commercially available from DuPont under the trade name VAZO™. In alternate non-limiting embodiments, VAZO-52, VAZO-64, VAZO-67, or VAZO-88 can be used as radical initiators.

In a non-limiting embodiment, the mixture can be heated for a period of time such that the double bonds are substantially consumed and a desired pre-calculated theoretical value for SH content is achieved. In a non-limiting embodiment, the mixture can be heated for a time period of from 1 hour to 5 days. In another non-limiting embodiment, the mixture can be heated at a temperature of from 40° C. to 100° C. In a further non-limiting embodiment, the mixture can be heated until a theoretical value for SH content of from 0.5% to 20% is achieved.

The number average molecular weight ($M_n$) of the resulting polythiol can vary widely. In a non-limiting embodiment, the number average molecular weight ($M_n$) of polythiol can be determined by the stoichiometry of the reaction. In alternate non-limiting embodiments, the $M_n$ of polythiol can be at least 400 g/mole, or less than or equal to 5000 g/mole, or from 1000 to 3000 g/mole.

In another non-limiting embodiment, trifunctional polythiol for use in the present invention can include a material represented by the following structural formula and reaction scheme:

(IV' m)

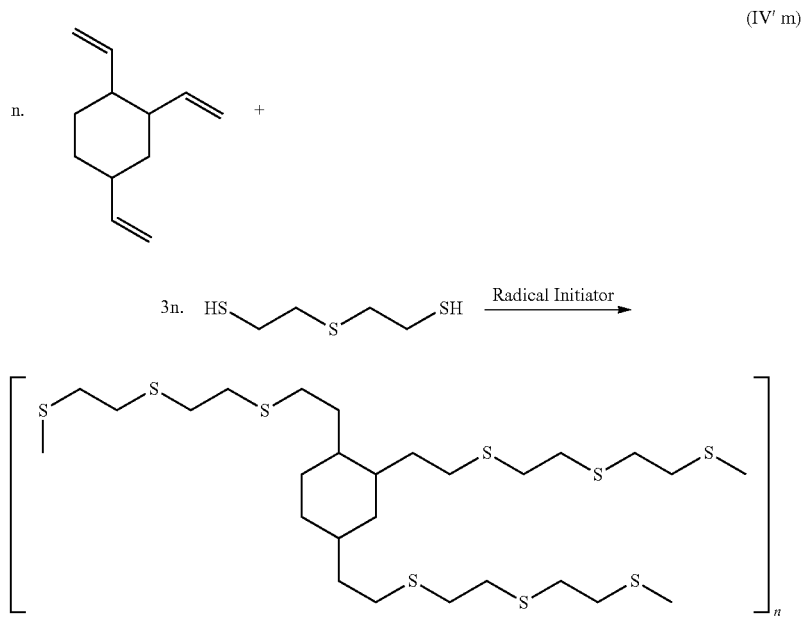

where n can be an integer from 1 to 20.

In a non-limiting embodiment, the polythiol of formula (IV'm) can be prepared by reacting "n" moles of 1,2,4-trivinylcyclohexane (TVCH) with "3n" moles of dimercaptodiethylsulfide (DMDS), and heating the mixture in the presence of a suitable free radical initiator, such as but not limited to VAZO 64.

In another non-limiting embodiment, trifunctional polythiol for use in the present invention can include a material represented by the following structural formula and reaction scheme:

In a non-limiting embodiment, the polythiol of formula (IV'p) can be prepared by reacting "n" moles of triallyl isocyanurate (TRIC) with "3n" moles of dimercaptodiethylsulfide (DMDS), and heating the mixture in the presence of a suitable free radical initiator, such as but not limited to VAZO 52.

In another non-limiting embodiment, trifunctional polythiol for use in the present invention can include a material represented by the following structural formula and reaction scheme:

(IV' p)

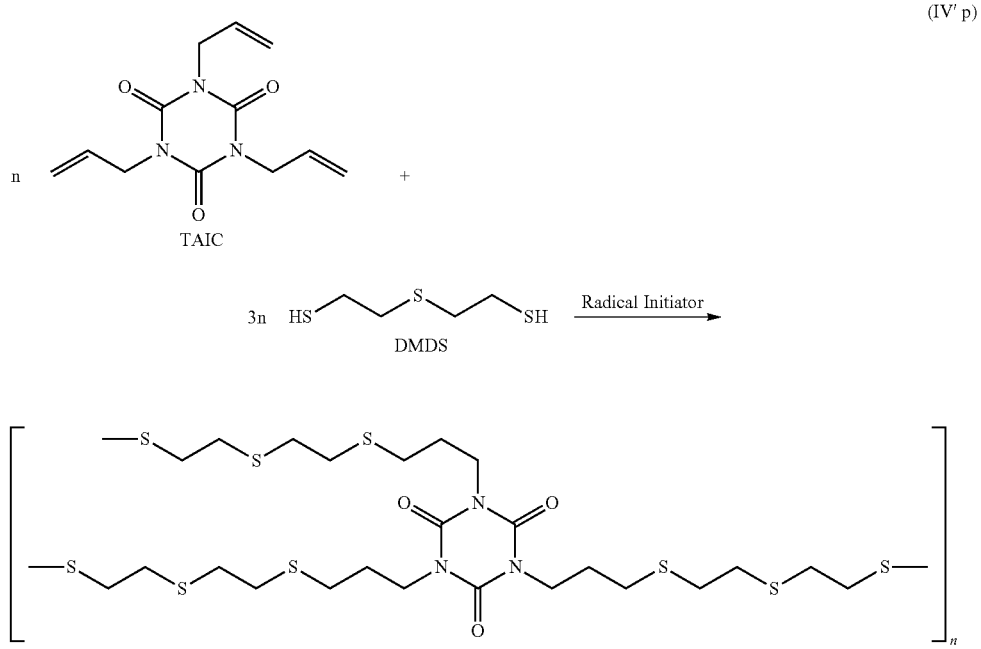

where n can be an integer from 1 to 20.

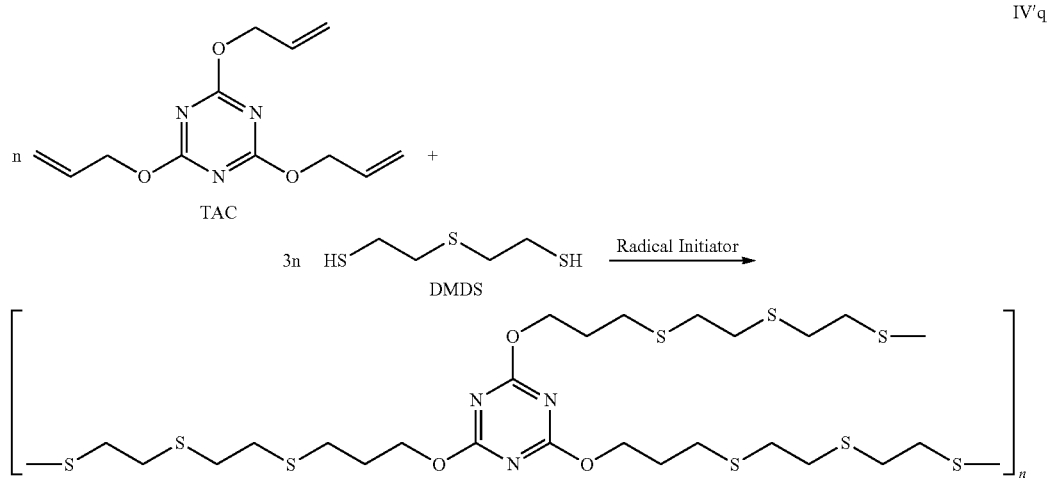

where n can be an integer from 1 to 20.

In a non-limiting embodiment, the polythiol of formula (IV'q) can be prepared by reacting "n" moles of triallyl cyanurate (TAC) with "3n" moles of dimercaptodiethylsulfide (DMDS), and heating the mixture in the presence of a suitable free radical initiator, such as but not limited to VAZO 52.

In another non-limiting embodiment, the polythiol for use in the present invention can include a material represented by the following structural formula:

In alternate non-limiting embodiments, the active hydrogen-containing material can have a number average molecular weight of at least 200 grams/mole, or at least 400 grams/mole, or at least 700 grams/mole, or at least 900 grams/mole; or less than or equal to 15,000 grams/mole, or less than or equal to 10,000 grams/mole, or less than or equal to 5,000 grams/mole, or less than or equal to; 2,500 grams/mole.

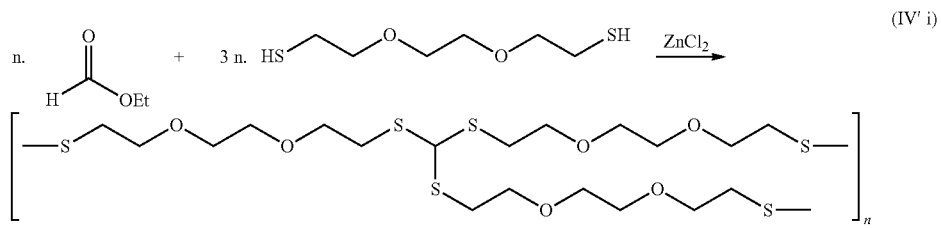

wherein n can be an integer from 1 to 20.

Various methods of preparing the polythiol of the formula (IV'i) are described in detail in U.S. Pat. No. 5,225,472, from column 2, line 8 to column 5, line 8.

In a non-limiting embodiment, "3n" moles of 1,8-dimercapto-3,6-dioxaooctane (DMDO) can be reacted with "n" moles of ethyl formate, as shown above, in the presence of anhydrous zinc chloride.

Non-limiting examples of suitable difunctional or trifunctional active hydrogen-containing materials having both hydroxyl and thiol groups can include but are not limited to 2-mercaptoethanol, 3-mercapto-1,2-propanediol, glycerin bis(2-mercaptoacetate), glycerin bis(3-mercaptopropionate), 1-hydroxy-4-mercaptocyclohexane, 1,3-dimercapto-2-propanol, 2,3-dimercapto-1-propanol, 1,2-dimercapto-1,3-butanediol, trimethylolpropane bis(2-mercaptoacetate), trimethylolpropane bis(3-mercaptopropionate), pentaerythritol mono(2-mercaptoacetate), pentaerythritol bis(2-mercaptoacetate), pentaerythritol tris(2-mercaptoacetate), pentaerythritol mono(3-mercaptopropionate), pentaerythritol bis(3-mercaptopropionate), pentaerythritol tris(3-mercaptopropionate), hydroxymethyl-tris(mercaptoethylthiomethyl)methane, dihydroxyethyl sulfide mono(3-mercaptopropionate, and mixtures thereof.

The sulfur-containing polyurethane of the present invention can be prepared using a variety of techniques known in the art.

In a non-limiting embodiment of the present invention, polyisocyanate, polyisothiocyanate or mixtures thereof; polythiol oligomer; optionally active hydrogen-containing material; and optionally urethanation catalyst; can be reacted to form sulfur-containing polyurethane prepolymer. In non-limiting embodiments, said active hydrogen-containing material can include at least one material selected from polyol, polythiol, polyfunctional material containing both hydroxyl and SH groups, or mixtures thereof. In a non-limiting embodiment, said polythiol can include dithiol oligomer. In a further non-limiting embodiment, said active hydrogen-containing material can include at least one material selected from trifunctional or higher-functional polyol, trifunctional or higher-functional polythiol, trifunctional or higher-functional material containing both hydroxyl and SH groups, or mixtures thereof. Non-limiting examples of suitable urethanation catalysts can include those disclosed hereing. In a further non-limiting embodiment, said sulfur-containing polyurethane prepolymer can be chain extended (i.e., reacted) with active hydrogen-containing material including at least one material selected from polyol, polythiol, polythiol oligomer, polyfunctional material containing both hydroxyl and SH groups, or mixtures thereof, which have been previously disclosed herein, and optionally in the presence of urethanation catalyst; to form sulfur-containing polyurethane polymer. In a non-limiting embodiment, said polythiol can include dithiol oligomer. In a further non-limiting embodiment, said active hydrogen-containing material reacted with sulfur-containing polyurethane prepolymer to form sulfur-containing polyurethane can include at least one material selected from trifunctional or higher-functional polyol, trifunctional or higher-functional polythiol, trifunctional or higher-functional material containing both hydroxyl and SH groups, or mixtures thereof.

In a non-limiting embodiment, said sulfur-containing polyurethane prepolymer can contain disulfide linkages by virtue of disulfide linkages contained in polythiol and/or polythiol oligomer used to prepare the polyurethane prepolymer.

In another non-limiting embodiment, polyisocyanate, polyisothiocyanate, or mixtures thereof, polythiol oligomer, active hydrogen-containing material, and optionally urethanation catalyst can be reacted together in a "one pot" process. In a further non-limiting embodiment, said active hydrogen-containing material can include at least one material chosen from trifunctional or higher-functional polyol, trifunctional or higher-functional polythiol, or higher-functional material containing both hydroxyl and SH groups, or mixtures thereof. In a further non-limiting embodiment, said active hydrogen-containing material can further comprise at least one material selected from diol, dithiol, difunctional material containing both hydroxyl and SH groups, or mixtures thereof. In a non-limiting embodiment, said dithiol can include dithiol oligomer.

In a non-limiting embodiment, the sulfur-containing polyurethane of the present invention can be prepared by combining polyisocyanate and/or polyisothiocyanate, polythiol oligomer, optionally active hydrogen-containing material, and optionally urethanation catalyst, to form sulfur-containing polyurethane prepolymer, and then adding active hydrogen-containing material and optionally urethanation catalyst to the sulfur-containing polyurethane prepolymer, and polymerizing the resulting mixture. In a further non-limiting embodiment, said prepolymer and said active hydrogen-containing material can be degassed under vacuum prior to mixing them and then carrying out the polymerization. Said active hydrogen-containing material can be mixed with the prepolymer using a variety of methods and equipment, such as but not limited to an impeller or extruder.

In another non-limiting embodiment, wherein the sulfur-containing polyurethane can be prepared by a one-pot process, the polyisocyanate and/or polyisothiocyanate, polythiol oligomer, active hydrogen-containing material, and optionally catalyst, can be separately degassed and then combined and mixed, and the resulting mixture can then be polymerized. In another non-limiting embodiment, said polyisocyanate and/or polyisothiocyanate can be mixed and then degassed; and said polythiol oligomer, active hydrogen-containing material, and optionally catalyst, can be mixed and then degassed, the said mixtures can then be mixed together and polymerized.

In another non-limiting embodiment, wherein a lens can be formed, the mixture of polyurethane-forming materials, including sulfur-containing polyurethane prepolymer, active hydrogen-containing materials and optionally urethanation catalyst; or the mixture of polyisocyanate and/or polyisothiocyanate, polythiol oligomer, and active hydrogen-containing materials and optionally urethanation catalyst, which can be optionally degassed, can be introduced into a mold and the mold can be heated (i.e., using a thermal cure cycle) using a variety of conventional techniques known in the art. The thermal cure cycle can vary depending on the reactivity and molar ratio of the reactants, and the presence of catalyst(s). In a non-limiting embodiment, the thermal cure cycle can include heating the mixture of said polyurethane-forming materials from room temperature to a temperature of 200° C. over a period of from 0.5 hours to 120 hours; or from 80 to 150° C. for a period of from 5 hours to 72 hours.

In a non-limiting embodiment, a urethanation catalyst can be used in the present invention to enhance the reaction of the polyurethane-forming materials. Suitable urethanation catalysts can vary and can include those known in the art; for example, suitable urethanation catalysts can include those catalysts that are useful for the formation of urethane by reaction of the NCO and OH-containing materials and/or the reaction of the NCO and SH-containing materials. Non-limiting examples of suitable catalysts can be chosen from the group of Lewis bases, Lewis acids and insertion catalysts as described in Ullmann's Encyclopedia of Industrial Chemistry, $5^{th}$ Edition, 1992, Volume A21, pp. 673 to 674. Non-limiting examples can include but are not limited to tin compounds, tertiary amine catalysts, or mixtures thereof. In non-limiting embodiments, tin compounds suitable for use as urethanation catalyst can include stannous salt of an organic acid, such as but not limited to stannous octoate, dibutyl tin dilaurate, dibutyl tin diacetate, dibutyl tin mercaptide, dibutyl tin dimaleate, dimethyl tin diacetate, dimethyl tin dilaurate, and mixtures thereof. Non-limiting examples of tertiary amines suitable for use as urethanation catalyst can include triethylamine, triisopropylamine, dimethyl cyclohexylamine, N,N-dimethylbenzylamine, 1,4-diazabicyclo[2.2.2]octane, and mixtures thereof; and tertiary amines disclosed in U.S. Pat. No. 5,693,738 at column 10, lines 6-38, the disclosure of which is incorporated herein by reference. Alternate non-limiting examples of suitable urethanation catalyst can include tertiary ammonium salts, phosphines, zinc octoate, ferric acetylacetonate, or suitable bismuth compounds.

In alternate non-limiting embodiments, various known additives can be incorporated into the sulfur-containing polyurethane of the present invention. Such additives can include but are not limited to light stabilizers, heat stabilizers, antioxidants, ultraviolet light absorbers, mold release agents, static (non-photochromic) dyes, pigments and flexibilizing additives, such as but not limited to alkoxylated phenol benzoates and poly(alkylene glycol) dibenzoates. Non-limiting examples of anti-yellowing additives can include 3-methyl-2-butenol, organo pyrocarbonates, triphenyl phosphite (CAS registry no. 101-02-0), and hindered phenol antioxidants. Such additives can be present in an amount such that the additive constitutes less than 10 percent by weight, or less than 5 percent by weight, or less than 3 percent by weight, based on the total weight of the prepolymer. In alternate non-limiting embodiments, the aforementioned optional additives can be mixed with the polyisocyanate and/or polyisothiocyanate. In a further non-limiting embodiment, the optional additives can be mixed with active hydrogen-containing material.

In a non-limiting embodiment, the resulting sulfur-containing polyurethane of the present invention when at least partially cured can be solid and essentially transparent such that it is suitable for optical or ophthalmic applications. In alternate non-limiting embodiments, the sulfur-containing polyurethane can have a refractive index of at least 1.55, or at least 1.56, or at least 1.57, or at least 1.58, or at least 1.59, or at least 1.60, or at least 1.62, or at least 1.65. In further alternate non-limiting embodiments, the sulfur-containing polyurethane can have an Abbe number of at least 30, or at least 32, or at least 35, or at least 38, or at least 39, or at least 40, or at least 44.

In a non-limiting embodiment, the sulfur-containing polyurethane when polymerized and at least partially cured can demonstrate good impact resistance/strength. Impact resistance can be measured using a variety of conventional methods known to one skilled in the art. In a non-limiting embodiment, the impact resistance is measured using the Impact Energy Test which consists of testing a flat sheet sample of polymerizate having a thickness of 3 mm, and cut into a square piece approximately 4 cm×4 cm. Said flat sheet sample of polymerizate is supported on a flat O-ring which is attached to top of the pedestal of a steel holder, as defined below. Said O-ring is constructed of neoprene having a hardness of 40±5 Shore A durometer, a minimum tensile strength of 8.3 MPa, and a minimum ultimate elongation of 400 percent, and has an inner diameter of 25 mm, an outer diameter of 31 mm, and a thickness of 2.3 mm. Said steel holder consists of a steel base, with a mass of approximately 12 kg, and a steel pedestal affixed to said steel base. The shape of said steel pedestal is approximated by the solid shape which would result from adjoining onto the top of a cylinder, having an outer diameter of 75 mm and a height of 10 mm, the frustum of a right circular cone, having a bottom diameter of 75 mm, a top diameter of 25 mm, and a height of 8 mm, wherein the center of said frustum coincides with the center of said cylinder. The bottom of said steel pedestal is affixed to said steel base, and the neoprene O-ring is affixed to the top of the steel pedestal, with the center of said O-ring coinciding with the center of the steel pedestal. The flat sheet sample of polymerizate is set on top of the O-ring with the center of said flat sheet sample coinciding with the center of said O-ring. The Impact Energy Test is carried out by dropping steel balls of increasing weight from a distance of 50 inches (1.27 meters) onto the center of the flat sheet sample. The sheet is determined to have passed the test if the sheet does not fracture. The sheet is determined to have failed the test when the sheet fractures. As used herein, the term "fracture" refers to a crack through the entire thickness of the sheet into two or more separate pieces, or detachment of one or more pieces of material from the backside of the sheet (i.e., the side of the sheet opposite the side of impact). The impact strength of the sheet is reported as the impact energy that corresponds to the highest level (i.e., largest ball) at which the sheet passes the test, and it is calculated according to the following formula:

$$E=mgd$$

Wherein E represent impact energy in Joules (J), m represents mass of the ball in kilograms (kg), g represents acceleration due to gravity (i.e., 9.80665 m/sec$^2$) and d represents the distance of the ball drop in meters (i.e., 1.27 m). In an alternate non-limiting embodiment, using the Impact Energy Test as described herein, the impact strength can be at least 1.0 Joule, or at least 2.0 Joules, or at least 4.95 Joules.

In another non-limiting embodiment, the sulfur-containing polyurethane of the present invention when at least partially cured can have low density. In alternate non-limiting embodiments, the density can be at least 1.0, or at least 1.1 g/cm$^3$, or less than 1.45, or less than 1.4, or less than 1.3, or less than 1.25, or less than 1.2 g/cm$^3$, or from 1.0 to 1.2 grams/cm$^3$, or from 1.0 to 1.25 grams/cm$^3$, or from 1.0 to 1.3 grams/cm$^3$, or from 1.0 to 1.4 grams/cm$^3$, or from 1.0 to less than 1.45 grams/cm$^3$. In a non-limiting embodiment, the density is measured using a DensiTECH instrument manufactured by Tech Pro, Incorporated in accordance with ASTM D297.

Solid articles that can be prepared using the sulfur-containing polyuurethane of the present invention include but are not limited to optical lenses, such as plano and ophthalmic lenses, sun lenses, windows, automotive transparencies, such as windshields, sidelights and backlights, and aircraft transparencies.

In a non-limiting embodiment, the sulfur-containing polyurethane polymerizate of the present invention can be used to prepare photochromic articles, such as lenses. In a further embodiment, the polymerizate can be transparent to that portion of the electromagnetic spectrum which activates the photochromic substance(s), i.e., that wavelength of ultraviolet (UV) light that produces the colored or open form of the photochromic substance and that portion of the visible spectrum that includes the absorption maximum wavelength of the photochromic substance in its UV activated form, i.e., the open form.

A wide variety of photochromic substances can be used in the present invention. In a non-limiting embodiment, organic photochromic compounds or substances can be used. In alternate non-limiting embodiments, the photochromic substance can be incorporated, e.g., dissolved, dispersed or diffused into the polymerizate, or applied as a coating thereto.

In a non-limiting embodiment, the organic photochromic substance can have an activated absorption maximum within the visible range of greater than 590 nanometers. In a further non-limiting embodiment, the activated absorption maximum within the visible range can be between greater than 590 to 700 nanometers. These materials can exhibit a blue, bluish-green, or bluish-purple color when exposed to ultraviolet light in an appropriate solvent or matrix. Non-limiting examples of such substances that are useful in the present invention include but are not limited to spiro(indoline)naphthoxazines and spiro(indoline)benzoxazines. These and other suitable photochromic substances are described in U.S. Pat. Nos. 3,562,172; 3,578,602; 4,215,010; 4,342,668; 5,405,958; 4,637,698; 4,931,219; 4,816,584; 4,880,667; 4,818,096.

In another non-limiting embodiment, the organic photochromic substances can have at least one absorption maximum within the visible range of between 400 and less than 500 nanometers. In a further non-limiting embodiment, the substance can have two absorption maxima within this visible range. These materials can exhibit a yellow-orange color when exposed to ultraviolet light in an appropriate solvent or matrix. Non-limiting examples of such materials can include certain chromenes, such as but not limited to benzopyrans and naphthopyrans. Many of such chromenes are described in U.S. Pat. Nos. 3,567,605; 4,826,977; 5,066,818; 4,826,977; 5,066,818; 5,466,398; 5,384,077; 5,238,931; and 5,274,132.

In another non-limiting embodiment, the photochromic substance can have an absorption maximum within the visible range of between 400 to 500 nanometers and an absorption maximum within the visible range of between 500 to 700 nanometers. These materials can exhibit color(s) ranging from yellow/brown to purple/gray when exposed to ultraviolet light in an appropriate solvent or matrix. Non-limiting examples of these substances can include certain benzopyran compounds having substituents at the 2-position of the pyran ring and a substituted or unsubstituted heterocyclic ring, such as a benzothieno or benzofurano ring fused to the benzene portion of the benzopyran. Further non-limiting examples of such materials are disclosed in U.S. Pat. No. 5,429,774.

In a non-limiting embodiment, the photochromic substance for use in the present invention can include photochromic organo-metal dithizonates, such as but not limited to (arylazo)-thioformic arylhydrazidates, such as but not limited to mercury dithizonates which are described, for example, in U.S. Pat. No. 3,361,706. Fulgides and fulgimides, such as but not limited to 3-furyl and 3-thienyl fulgides and fulgimides which are described in U.S. Pat. No. 4,931,220 at column 20, line 5 through column 21, line 38, can be used in the present invention.

The relevant portions of the aforedescribed patents are incorporated herein by reference.

In alternate non-limiting embodiments, the photochromic articles of the present invention can include one photochromic substance or a mixture of more than one photochromic substances. In further alternate non-limiting embodiment, various mixtures of photochromic substances can be used to attain activated colors such as a near neutral gray or brown.

The amount of photochromic substance employed can vary. In alternate non-limiting embodiments, the amount of photochromic substance and the ratio of substances (for example, when mixtures are used) can be such that the polymerizate to which the substance is applied or in which it is incorporated exhibits a desired resultant color, e.g., a substantially neutral color such as shades of gray or brown when activated with unfiltered sunlight, i.e., as near a neutral color as possible given the colors of the activated photochromic substances. In a non-limiting embodiment, the amount of photochromic substance used can depend upon the intensity of the color of the activated species and the ultimate color desired.

In alternate non-limiting embodiments, the photochromic substance can be applied to or incorporated into the polymerizate by various methods known in the art. In a non-limiting embodiment, the photochromic substance can be dissolved or dispersed within the polymerizate. In a further non-limiting embodiment, the photochromic substance can be imbibed into the polymerizate by methods known in the art. The term "imbibition" or "imbibe" includes permeation of the photochromic substance alone into the polymerizate, solvent assisted transfer absorption of the photochromic substance into a porous polymer, vapor phase transfer, and other such transfer mechanisms. In a non-limiting embodiment, the imbibing method can include coating the photochromic article with the photochromic substance; heating the surface of the photochromic article; and removing the residual coating from the surface of the photochromic article. In alternate non-limiting embodiments, the imbibtion process can include immersing the polymerizate in a hot solution of the photochromic substance or by thermal transfer.

In alternate non-limiting embodiments, the photochromic substance can be a separate layer between adjacent layers of the polymerizate, e.g., as a part of a polymer film; or the photochromic substance can be applied as a coating or as part of a coating placed on the surface of the polymerizate.

The amount of photochromic substance or composition containing the same applied to or incorporated into the polymerizate can vary. In a non-limiting embodiment, the amount can be such that a photochromic effect discernible to the naked eye upon activation is produced. Such an amount can be described in general as a photochromic amount. In alternate non-limiting embodiments, the amount used can depend upon the intensity of color desired upon irradiation thereof and the method used to incorporate or apply the photochromic substance. In general, the more photochromic substance applied or incorporated, the greater the color intensity. In a non-limiting embodiment, the amount of photochromic substance incorporated into or applied onto a photochromic optical polymerizate can be from 0.15 to 0.35 milligrams per square centimeter of surface to which the photochromic substance is incorporated or applied.

In another embodiment, the photochromic substance can be added to the sulfur-containing polyurethane prior to polymerizing and/or cast curing the material. In this embodiment, the photochromic substance used can be chosen such that it is resistant to potentially adverse interactions with, for example, the isocyanate, isothiocyante groups present. Such adverse interactions can result in deactivation of the photochromic substance, for example, by trapping them in either an open or closed form.

Further non-limiting examples of suitable photochromic substances for use in the present invention can include photochromic pigments and organic photochromic substances encapsulated in metal oxides such as those disclosed in U.S. Pat. Nos. 4,166,043 and 4,367,170; organic photochromic substances encapsulated in an organic polymerizate such as those disclosed in U.S. Pat. No. 4,931,220.

EXAMPLES

In the following examples, unless otherwise stated, the Infrared Spectra were measured on Mattson Sirius 100 FT-IR apparatus; the refractive index and Abbe number were measured on a multiple wavelength Abbe Refractometer Model DR-M2 manufactured by ATAGO Co., Ltd.; the refractive index and Abbe number of liquids were measured in accordance with ASTM-D1218; the refractive index and Abbe number of solids were measured in accordance with ASTM-D542; the refractive index (e-line) was measured at a temperature of 20° C.; and the viscosity was measured using a Brookfield CAP 2000+ Viscometer.

The NCO concentration of the prepolymer (Component A) was determined by reaction with an excess of n-dibutylamine (DBA) to form the corresponding urea followed by titration of the unreacted DBA with HCl in accordance with ASTM-2572-97.

Reagents
1. Tetrahydrofuran (THF), reagent grade.
2. 80/20 THF/propylene glycol (PG) mix. This solution was prepared in-lab by mixing 0.8 L PG with 3.2 Liters of THF in 4 Liter bottle.
3. DBA certified ACS.
4. DBA/THF solution. 150 mL of dibutylamine (DBA) was combined with 750 mL tetrahydrofuran (THF); it was mixed well and transfered to an amber bottle.
5. Hydrochloric acid, concentrated. ACS certified.
6. Isopropanol, technical grade.
7. Alcoholic hydrochloric acid, 0.2N. 75-ml of concentrated hydrochloric acid was slowly added to a 4-liter bottle of technical grade isopropanol, while stirring with a magnetic stirrer. It was mixed for a minimum of 30 minutes. This solution was standardized using Tris hydroxyl methyl amino methane (THAM) as follows: Into a glass 100-mL beaker, was weighed approximately 0.6 g THAM primary standard to the nearest 0.1 mg and the weight was recorded. 100-mL DI water was added and mixed to dissolve and titrated with the prepared alcoholic HCl. This procedure was repeated a minimum of one time and the values averaged using the calculation below.

$$\text{Normality HCL} = \frac{(\text{Standard wt., grams})}{(\text{mLs HCl}) (0.12114)}$$

53

Equipment

1. Polyethylene beakers, 200-mL, Falcon specimen breakers, No. 354020.
2. Polyethylene lids for above, Falcon No. 354017.
3. Magnetic stirrer and stirring bars.
4. Brinkmann dosimeter for dispensing or 10-mL pipet.
5. Autotitrator equipped with pH electrode.
6. 25-mL, 50-mL dispensers for solvents or 25-mL and 50-mL pipets.

Procedure—

1. Blank determination: Into a 220-mL polyethylene beaker was added 50 mL THF followed by 10.0 mL DBA/THF solution. The solution was capped and allowed to mix with magnetic stirring for 5 minutes. 50 mL of the 80/20 THF/PG mix was added and titrated using the standardized alcoholic HCl solution and this volume was recorded. This procedure was repeated and these values averaged for use as the blank value.
2. In a polyethylene beaker was weighed 1.0 gram of the prepolymer sample and this weight was recorded to the nearest 0.1 mg. 50 mL THF was added, the sample was capped and allowed to dissolve with magnetic stirring.
3. 10.0 mL DBA/THF solution was added, the sample was capped and allowed to react with stirring for 15 minutes.
4. 50 mL 80/20 THF/PG solution was added.
5. The beaker was placed on the titrator and the titration was started. This procedure was repeated.

CALCULATIONS—

$$\%NCO = \frac{(\text{mls Blank} - \text{mls Sample}) \times (\text{Normality HCl}) \times (4.2018)}{\text{sample weight, g}}$$

$$IEW = \frac{(\text{Sample wt., grams}) \times (1000)}{(\text{mls Blank} - \text{mls Sample}) \times (\text{Normality HCl})}$$

$IEW$ = Isocyanate Equivalent Weight

The SH groups within the product were determined using the following procedure. A sample size (0.1 g) of the product was combined with 50 mL of tetrahydrofuran (THF)/propylene glycol (80/20) solution and stirred at room temperature until the sample was substantially dissolved. While stirring, 25.0 mL of 0.1 N iodine solution (commercially obtained from Aldrich 31, 8898-1) was added to the mixture and allowed to react for a time period of 5 to 10 minutes. To this mixture was added 2.0 mL concentrated HCl. The mixture was titrated potentiometrically with 0.1 N sodium thiosulfate in the millivolt (mV) mode. The resulting volume of titrant is represented as "mLs Sample" in the below equation. A blank value was initially obtained by titrating 25.0 mL of iodine (including 1 mL of concentrated hydrochloric acid) with sodium thiosulfate in the same manner as conducted with the product sample. This resulting volume of titrant is represented as "mLs Blank" in the below equation.

$$\%SH = \frac{(mLsBlank - mLsSample)\ (\text{Normality Na}_2\text{S}_2\text{O}_3)\ (3.307)}{\text{sample weight, g}} = 13.4$$

54

Example 1

Synthesis of Dithiol Oligomer from DMDS/VCH, 2:1 Mole Ratio (PT-1)

Charged into a 1-liter 4-necked flask equipped with a mechanical stirrer, thermometer and two gas passing adapters (one for inlet and one for outlet), was dimercaptodiethyl sulfide (DMDS) (888.53 g, 5.758 moles). The flask was flushed with dry nitrogen and 4-vinyl-1-cyclohexene (VCH) (311.47 g, 2.879 moles) was added with stirring during a time period of 2 hours and 15 minutes. The reaction temperature increased from room temperature to 62° C. after 1 hr of addition. Following addition of the VCH, the temperature was 37° C. The reaction mixture was then heated to a temperature of 60° C., and five 0.25 g-portions of free radical initiator Vazo-52 (2,2'-azobis(2,4-dimethylpentanenitrile) obtained from DuPont) were added. Each portion was added after an interval of one hour. The reaction mixture was evacuated at 60° C./4-5 mm Hg for one hour to yield 1.2 kg (yield: 100%) of colorless liquid with the following properties: viscosity of 300 cps @ 25° C., refractive index of 1.597, Abbe number of 39 and SH groups content of 15.9%, SHEW of 208 g/equivalent.

Example 2

Synthesis of Block-Type Dithiol Oligomer from PT-1 and DIPEB, 2:1 Mole Ratio (PT-2)

Into a 0.5-liter, 3-necked flask equipped with a mechanical stirrer and thermometer were charged 131.4 g (0.317 moles) of PT-1. To the mixture was then added at once 25.1 g (0.159 moles) of 1,3-diisopropenylbenzene (DIPEB) and the temperature was increased to 65° C. Two 0.03 g-portions of free radical initiator AIBN (2,2'-azobis(2-methyl-propionitrile)) were added. Each of the two portions was added after an interval of two hours. The temperature was maintained at 65° C. for another 2 hours and then double bond analysis (IR spectroscopy) and SH analysis were conducted. The results showed completion of the reaction. The reaction product (156.5 g, 100% yield) was a clear viscous liquid having a viscosity of 596 cP at 73° C., refractive index of 1.613, Abbe number of 37 and SHEW of 539 g/equivalent.

Example 3

Synthesis of Block-Type Dithiol Oligomer from DMDS, DIPEB and DEGDVE (PT-3)

Into a 1-liter, 3-necked flask equipped with a mechanical stirrer and thermometer was charged 617.20 g (4.00 moles) of 2-mercaptoethyl sulfide (DMDS). To the DMDS was added dropwise 316.50 g (2.00 moles) of 1,3-diisopropenylbenzene (DIPEB) at a rate which allowed the temperature of the mixture to be maintained at less than 65° C. Following addition of all of the 1,3-diisopropenylbenzene, the temperature was maintained at 65° C. for an additional 30 minutes. Five 0.25 g-portions of free radical initiator Vazo-52 were added. Each of the five portions was added after an interval of one hour. Following completion of the reaction, analysis for the presence of double bonds was conducted and showed no double bonds were present. To the mixture was then added 158.0 g (1.0 mole) of diethyleneglycol divinyl ether (DEGDVE), and two 0.25 g-portions of free radical initiator AIBN were added. Each of the two portions of AIBN was added after an interval of two hours. The temperature of the mixture was maintained at 65° C. for an additional 2 hours, and then the double bond analysis and SH analysis were conducted. The results showed completion of the reaction. The reaction product (1088 g, 100% yield) was clear viscous liquid having a viscosity of 300 cP at 73° C., refractive index of 1.603, Abbe number of 37 and SHEW of 540 g/equivalent.

Example 4

Synthesis of Polythiol Oligomer from Three Equivalents DMDS and One Equivalent Triallyl Isocyanurate (TAIC) (Pt-4)

Into a 1-liter 3-necked flask equipped with a mechanical stirrer and thermometer were charged 462.90 grams of 2-mercaptoethyl sulfide (DMDS) (3.0 moles) and 249.27 grams of triallyl isocyanurate (TAIC) (1.00 mole). The mixture was heated to 60° C. and then three 0.17 g-portions of free radical initiator Vazo-52 were added at 2 hour intervals. The mixture was stirred and maintained at a temperature of 60° C. for a total of 8 hours. A double bond analysis showed no presence of allyl double bonds. The reaction product (712.17 g, 100% yield) was a clear liquid having a viscosity of 445 cP at 73° C., refractive index of 1.609, Abbe number of 38 and SHEW of 248 g/equivalent.

Example 5

Synthesis of Dithiol Oligomer from DMDS/VNB, 2:1 Mole Ratio (PT-5)

308 grams of DMDS (2 moles) were charged to a glass jar and the contents were heated to a temperature of 60° C. To the jar was slowly added 120 grams of VNB (1 mole) with mixing. The addition rate was adjusted such that the temperature of the mixture did not exceed 70° C. Once the addition of VNB was completed, stirring of the mixture was continued at 60° C. for additional 1 hour. After that time to the mixture were added five 0.04 gram portions of VAZO 52 (one portion added once every hour). The mixture was then stirred at a temperature of 60° C. for an additional 3 hours, after which time the product was titrated and found to have an SH equivalent weight of 214 g/equivalent. Analysis for the presence of double bonds was conducted and showed no double bonds were present. The viscosity was 56 cps at 73° C., the refractive index was 1.609, and the Abbe number was 41.

Example 6

Synthesis of Block-Type Dithiol Oligomer from PT-5 and Ethylene Glycol Dimethacrylate (EGDM), 2:1 Mole Ratio (PT-6)

At ambient temperature, 134.0 g of Dithiol Oligomer described in Example 5 (PT-5) (0.313 moles) and 30.8 g EGDM (0.156 moles) were charged to a glass jar and mixed. 0.015 g 1,8-Diazabicyclo[5.4.0]undec-7-ene (DBU) were added to the mixture. Slight increase of the temperature of the mixture was observed, up to 36° C. initially, then the temperature went back to room temperature. The mixture was stirred at room temperature for 16 hours after which time the product was titrated and found to have an SH equivalent weight of 516 g/equivalent. The viscosity at 73° C. was 284 cps, the refractive index was 1.594, and the Abbe number was 42.

Example 7

Synthesis of Dithiol Oligomer from DMDS/DIPEB 2:1 Mole Ratio (PT-7)

524.6 g of DMDS (3.4 moles) was charged to a glass jar, and the contents were heated to a temperature of 60° C. To the jar was slowly added 269 g of DIPEB (1.7 moles) with mixing at a rate that kept the temperature below 60° C. Once the addition of DIPEB was completed, the jar was placed in an oven heated to 60° C. for 2 hours. The jar was then removed from the oven; 0.1 g VAZO 52 was dissolved into the contents of the jar; and the jar was returned to the oven at 60° C. for a period of 20 hours. The sample of the resulting mixture was titrated for SH equivalents and was found to have an equivalent weight of 145 g/equivalent. 0.1 g VAZO 52 was dissolved into the reaction mixture, which was then returned to the oven at 60° C. Over a time period of 8 hours, the reaction mixture was kept in the 60° C. oven, and two more additions of 0.2 g VAZO 52 were made. After 17 hours, the resulting sample was titrated, giving an SH equivalent weight of 238 g/equivalent. The viscosity of the material at 25° C. was 490 cps. The refractive index of the product was 1.615, and the Abbe number was 34.

Example 8

Synthesis of Block-Type Dithiol Oligomer from PT-7 and VNB, 2:1 Mole Ratio (PT-8)

At ambient temperature, 285.6 g of dithiol oligomer described in Example 7 (PT-7), (0.6 moles) and 36.1 g VNB (0.3 moles) were charged to a glass jar and mixed. The mixture was put in an oven at 62° C. for 1 hour. Then three 0.1 g portions of free radical initiator VAZO 52 were added into the mixture every three hours and the jar was subsequently placed in an oven heated to 62° C. After the last addition of radical initiator the mixture was kept in the oven at 62° C. for an additional 10.0 hours. The mixture was removed from the oven, and the resulting sample was titrated for SH equivalents and had an equivalent weight of 454 g/equivalent. An additional 0.1 g VAZO 52 was then added to the mixture, and the mixture was returned to the oven for 24 hours. After this time the mixture was removed from the oven and the equivalent weight of the resulting material was titrated and showed SH equivalent weight 543 g/equivalent. IR analysis showed no presence of double bonds. The viscosity at 73° C. was 459 cps, the refractive index was 1.617, and the Abbe number was 36.

Example 9

Polyurethane Prepolymer from PT-2 and Desmodur W (PUP-1)

Into a glass jar were charged under nitrogen pillow 48.30 g (0.0484 moles) of PT-2 and 53.75 g (0.2051 moles) of 4,4'-methylenebis(cyclohexyl isocyanate), which was obtained from Bayer Corp. under the trade name Desmodur W. The mixture was heated to a temperature of 70° C. and homogenized. 0.050 g (500 ppm) of N,N-dimethyl cyclohexylamine catalyst (Polycat 8, obtained from Air Products and Chemicals, Inc.) was added and the mixture was stirred at a temperature of 70° C. for 2 hours. The SH analysis was conducted and showed consumption of SH groups and completion of the reaction. The polythiourethane prepolymer (102 g, 100% yield) was a clear viscous liquid and had NCO content of 11.00%, viscosity of 2838 cP at 73° C., refractive index of 1.571 and Abbe number of 43.

Example 10

Polyurethane Polymer from PUP-1 (PU-1)

Mixed together were 40 g (0.105 NCO eq.) of PUP-1 and 1 drop of dibutyltin dilaurate (DBTDL) catalyst. The mixture was degassed at a temperature of 80° C. under vacuum for 4 hours. Mixed together were 22.62 g (0.0912 SH eq.) of PT-4 and 1 drop of Polycat 8. This mixture was degassed at a temperature of 80° C. under vacuum for 2 hours. The two mixtures were then combined and mixed at a temperature of 80° C. and the resulting mixture was cast into a flat glass plate mold. The temperature was increased to 130° C. and the mixture in the mold was heated for 16 hours. The cured polymer product was clear, colorless, and had a refractive index of 1.608, an Abbe number of 40, and impact strength* of 2.5 J.

The following provides the ball sizes used and the corresponding impact energy.

| Ball weight, kg | Impact Energy, J |
|---|---|
| 0.016 | 0.20 |
| 0.022 | 0.27 |
| 0.032 | 0.40 |
| 0.045 | 0.56 |
| 0.054 | 0.68 |
| 0.067 | 0.83 |
| 0.080 | 1.00 |
| 0.094 | 1.17 |
| 0.110 | 1.37 |
| 0.129 | 1.60 |
| 0.149 | 1.85 |
| 0.171 | 2.13 |
| 0.198 | 2.47 |
| 0.223 | 2.77 |
| 0.255 | 3.17 |
| 0.286 | 3.56 |
| 0.321 | 3.99 |
| 0.358 | 4.46 |
| 0.398 | 4.95 |
| 1.066 | 13.30 |

Example 11

Polyurethane Prepolymer from PT-6 and Desmodur W (PUP-2)

Into a glass jar were charged under nitrogen pillow 103.2 g (0.1 moles) of PT-6 and 104.8 g (0.4 moles) of Desmodur W. The mixture was homogenized then heated to a temperature of 65° C. and stirred at this temperature for 16 hours. The SH analysis was conducted and showed consumption of SH groups and completion of the reaction. The polyurethane prepolymer (208 g, 100% yield) was a clear viscous liquid and had NCO content of 12.20%, viscosity of 1774 cps at 73° C., refractive index of 1.557 and Abbe number of 43.

The invention has been described with reference to non-limiting embodiments. Obvious modifications and alterations can occur to others upon reading and understanding the detailed description. It is intended that the invention be construed as including all such modifications and alterations insofar as they come within the scope of the appended claims or the equivalents thereof.

We claim:
1. A sulfur-containing polyurethane comprising the reaction product of:
   (I) polyisocyanate, polyisothiocyanate, or mixture thereof;
   (II) polythiol oligomer; and
   (III) active hydrogen-containing material including at least one material selected from trifunctional or higher-functional polyol, trifunctional or higher-functional polythiol, trifunctional or higher-functional material containing both hydroxyl and SH groups, or mixtures thereof; wherein said polythiol oligomer (II) is the reaction product of:
   (a) two or more different dienes comprising
      (i) at least one first diene comprising
      an aromatic ring-containing diene, having the following structural formula:

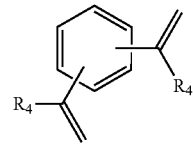

wherein $R_4$ can represent hydrogen or methyl; and
      (ii) at least one second diene selected from a non-aromatic monocyclic diene, and non-aromatic polycyclic diene; and
   (b) one or more dithiol; and
   wherein the stoichiometric ratio of the sum of the number of equivalents of all polythiols to the sum of the number of equivalents of all dienes used to form said polythiol oligomer (II) is greater than 1.0:1.0.

2. The sulfur-containing polyurethane of claim 1 wherein said aromatic ring-containing diene is selected from 1,3-diisopropenyl benzene, divinyl benzene, and mixtures thereof.

3. The sulfur-containing polyurethane of claim 1 wherein said stoichiometric ratio is from 1.1:1.0 to 1.5:1.0.

4. The sulfur-containing polyurethane of claim 1 wherein said polythiol oligomer further comprises trifunctional or higher-functional polythiol.

5. The sulfur-containing polyurethane of claim 1 wherein said active hydrogen-containing material further comprises at least one material selected from diol, dithiol, difunctional material containing both hydroxyl and SH groups, or mixtures thereof.

6. The sulfur-containing polyurethane of claim 5 wherein said dithiol includes dithiol oligomer.

7. The sulfur-containing polyurethane of claim 1 having a refractive index of at least 1.55 and an Abbe number of at least 30, when polymerized.

8. The sulfur-containing polyurethane of claim 1 having a refractive index of at least 1.55 and an Abbe number of at least 35, when polymerized.

9. The sulfur-containing polyurethane of claim 1 having a refractive index of at least 1.57, and an Abbe number of at least 30, when polymerized.

10. The sulfur-containing polyurethane of claim 1 having a refractive index of at least 1.57 and an Abbe number of at least 35, when polymerized.

11. The sulfur-containing polyurethane of claim 1 having a refractive index of at least 1.59 and an Abbe number of at least 30, when polymerized.

12. The sulfur-containing polyurethane of claim 1 prepared by:

(A) reacting (i) polyisocyanate, polyisothiocyanate, or mixture thereof;

(ii) polythiol oligomer formed by the reaction of two or more different dienes and one or more dithiols, said dienes comprising at least one first diene comprising an aromatic ring-containing diene having the following structural formula:

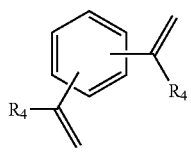

wherein $R_4$ can represent hydrogen or methyl; and at least one second diene selected from a non-aromatic monocyclic diene, non-aromatic polycyclic diene, and mixtures thereof, wherein stoichiometric ratio of the sum of the number of equivalents of all polythiols to the sum of the number of equivalents of all dienes used to form said polythiol oligomer is greater than 1.0:1.0; and (iii) active hydrogen-containing material including at least one material selected from trifunctional or higher-functional polyol, trifunctional or higher-functional polythiol, trifunctional or higher-functional material containing both hydroxyl and SH groups, or mixtures thereof, to form sulfur-containing polyurethane prepolymer; and (B) reacting said sulfur-containing polyurethane prepolymer with active hydrogen-containing material including at least one material selected from polyol, polythiol, polyfunctional material containing both hydroxyl and SH groups, or mixtures thereof.

13. The sulfur-containing polyurethane of claim 12 wherein said active hydrogen-containing material of (iii) further comprises at least one material selected from diol, dithiol, difunctional material containing both hydroxyl and SH groups, or mixtures thereof.

14. The sulfur-containing polyurethane of claim 13 wherein said dithiol includes dithiol oligomer.

15. The sulfur-containing polyurethane of claim 12 wherein said polythiol of (ii) includes dithiol oligomer.

16. The sulfur-containing polyurethane of claim 1 prepared by:

reacting polyisocyanate, polyisothiocyanate, or mixture thereof; and polythiol oligomer formed by the reaction of two or more different dienes and one or more dithiol, said dienes comprising (i) at least one first diene comprising aromatic ring-containing diene having the following structural formula:

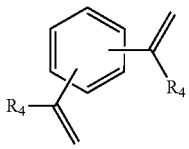

wherein $R_4$ can represent hydrogen or methyl; and (ii) at least one second diene selected from a non-aromatic cyclic diene, and non-aromatic polycyclic diene, wherein stoichiometric ratio of sum of number of equivalents of all polythiols to sum of number of equivalents of all dienes used to form said polythiol oligomer is greater than 1.0:1.0; to form sulfur-containing polyurethane prepolymer; and reacting said sulfur-containing polyurethane prepolymer with active hydrogen-containing material including at least one material selected from trifunctional or higher-functional polyol, trifunctional or higher-functional polythiol, trifunctional or higher-functional material containing both hydroxyl and SH groups, or mixtures thereof.

17. The sulfur-containing polyurethane of claim 16 wherein (iii) further comprises active hydrogen-containing material including at least one material selected from polyol, polythiol, polyfunctional material containing both hydroxyl and SH groups, or mixtures thereof.

18. The sulfur-containing polyurethane of claim 17 wherein said polythiol includes dithiol oligomer.

19. The sulfur-containing polyurethane of claim 16 wherein said active hydrogen-containing material further comprises at least one material selected from diol, dithiol, difunctional material containing both hydroxyl and SH groups, or mixtures thereof.

20. The sulfur-containing polyurethane of claim 19 wherein said dithiol includes dithiol oligomer.

21. The sulfur-containing polyurethane of claim 1 prepared by reacting polyisocyanate, polyisothiocyanate, or mixture thereof;

polythiol oligomer formed by the reaction of two or more different dienes and one or more dithiol, said dienes comprising (i) at least one first diene comprising aromatic ring-containing diene having the following structural formula:

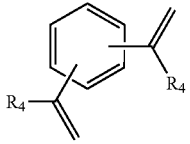

wherein $R_4$ can represent hydrogen or methyl; and (ii) at least one second diene selected from a non-aromatic monocyclic diene, and non-aromatic polycyclic diene, wherein stoichiometric ratio of the sum of the number of equivalents of all polythiols to the sum of the number of equivalents of all dienes used to form said polythiol oligomer is greater than 1.0:1.0; and active hydrogen-containing material including at least one material selected from trifunctional or higher-functional polyol, trifunctional or higher-functional polythiol, trifunctional or higher-functional material containing both hydroxyl and SH groups, or mixtures thereof, in a one-pot process.

22. The sulfur-containing polyurethane of claim 21 wherein said active hydrogen-containing material further comprises at least one material selected from diol, dithiol, difunctional material containing both hydroxyl and SH groups, or mixtures thereof.

23. The sulfur-containing polyurethane of claim 22 wherein said dithiol includes dithiol oligomer.

24. The sulfur-containing polyurethane of claim 1 wherein said polyisocyanate is chosen from aliphatic polyisocyanates, cycloaliphatic polyisocyanates, aromatic polyisocyanates, cyclic dimers and cyclic trimers thereof, and mixtures thereof.

25. The sulfur-containing polyurethane of claim 24 wherein said polyisocyanate is chosen from 1,3-bis(1-isocyanato-1-methylethyl)benzene; 3-isocyanato-methyl-3,5,5-trimethyl cyclohexyl isocyanate; 4,4'-methylene bis(cyclohexyl isocyanate); meta-xylylene diisocyanate; or mixtures thereof.

26. The sulfur-containing polyurethane of claim 12 wherein said polyisocyanate, polyisothiocyanate, or mixture thereof used to prepare said sulfur-containing polyurethane prepolymer is polyisocyanate.

27. The sulfur-containing polyurethane of claim 26 wherein the amount of said polyisocyanate, the amount of said polythiol oligomer, and the amount of said active hydrogen-containing are selected such that the equivalent ratio of (NCO):(SH+OH) is from 2.0:1.0 to 5.5:1.0.

28. The sulfur-containing polyurethane of claim 12 wherein the amount of said sulfur-containing polyurethane prepolymer and the amount of said active hydrogen-containing of (B) to form sulfur-containing polyurethane are selected such that the equivalent ratio of (OH+SH):(NCO) is from 1.1:1.0 to 0.85:1.0.

29. The sulfur-containing polyurethane of claim 16 wherein said polyisocyanate, polyisothiocyanate, or mixture thereof used to prepare said sulfur-containing polyurethane prepolymer is polyisocyanate.

30. The sulfur-containing polyurethane of claim 29 wherein the amount of said polyisocyanate, and the amount of said polythiol oligomer are selected such that the equivalent ratio of (NCO):(SH) is from 2.0:1.0 to 5.5:1.0.

31. The sulfur-containing polyurethane of claim 16 wherein the amount of said sulfur-containing polyurethane prepolymer and the amount of said active hydrogen-containing material to form sulfur-containing polyurethane are selected such that the equivalent ratio of (OH+SH):(NCO) is from 1.1:1.0 to 0.85:1.0.

32. A method of preparing sulfur-containing polyurethane comprising:
(a) reacting
polyisocyanate, polyisothiocyanate, or mixture thereof; and
polythiol oligomer formed by the reaction of two or more different dienes and one or more dithiol, said dienes comprising
(i) at least one first diene comprising aromatic ring-containing diene having the following structural formula:

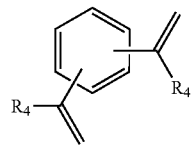

wherein $R_4$ can represent hydrogen or methyl; and
(ii) at least one second diene selected from a non-aromatic monocyclic diene, and non-aromatic polycyclic diene, wherein stoichiometric ratio of the sum of the number of equivalents of all polythiols to the sum of the number of equivalents of all dienes used to form said polythiol oligomer is greater than 1.0:1.0; and
active hydrogen-containing material including at least one material selected from trifunctional or higher-functional polyol, trifunctional or higher-functional polythiol, trifunctional or higher-functional material containing both hydroxyl and SH groups, or mixtures thereof, to form sulfur-containing polyurethane prepolymer; and
(b) reacting said sulfur-containing polyurethane prepolymer with active hydrogen-containing material including at least one material selected from polyol, polythiol, polyfunctional material containing both hydroxyl and SH groups, or mixtures thereof, to form said sulfur-containing polyurethane.

33. Method of claim 32 wherein said active hydrogen-containing material of (a) further comprises at least one material selected from diol, dithiol, difunctional material containing both hydroxyl and SH groups, or mixtures thereof.

34. Method of claim 32 wherein said polythiol of (b) includes dithiol oligomer.

35. Method of preparing sulfur-containing polyurethane comprising:
(a) reacting
polyisocyanate, polyisothiocyanate, or mixture thereof; and
polythiol oligomer formed by the reaction of two or more different dienes and one or more dithiol, said dienes comprising
(i) at least one first diene comprising aromatic ring-containing diene having the following structural formula:

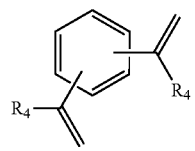

wherein $R_4$ can represent hydrogen or methyl; and
(ii) at least one second diene selected from a non-aromatic monocyclic diene, and non-aromatic polycyclic diene, wherein stoichiometric ratio of sum of number of equivalents of all polythiols to sum of number of equivalents of all dienes used to form said polythiol oligomer is greater than 1.0:1.0; to form sulfur-containing polyurethane prepolymer; and
(b) reacting said sulfur-containing polyurethane prepolymer with active hydrogen-containing material including at least one material selected from trifunctional or higher-functional polyol, trifunctional or higher-functional polythiol, trifunctional or higher-functional material containing both hydroxyl and SH groups, or mixtures thereof, to form said sulfur-containing polyurethane.

36. Method of claim 35 wherein a) further comprises active hydrogen-containing material including at least one material selected from polyol, polythiol, polyfunctional material containing both hydroxyl and SH groups, or mixtures thereof.

37. Method of claim 35 wherein said active hydrogen-containing material of (b) further comprises at least one material selected from diol, dithiol, difunctional material containing both hydroxyl and SH groups, or mixtures thereof.

38. A method of preparing sulfur-containing polyurethane comprising reacting:
(a) polyisocyanate, polyisothiocyanate, or mixture thereof;
(b) polythiol oligomer formed by the reaction of two or more different dienes and one or more dithiol, said dienes comprising
(i) at least one first diene comprising aromatic ring-containing diene having the following structural formula:

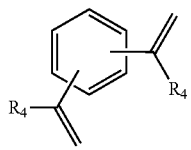

wherein $R_1$ can represent hydrogen or methyl; and (ii) at least one second diene selected from a non-aromatic cyclic diene, and non-aromatic polycyclic diene, wherein stoichiometric ratio of the sum of the number of equivalents of all polythiols to the sum of the number of equivalents of all dienes used to form said polythiol oligomer is greater than 1.0:1.0; and (c) active hydrogen-containing material including at least one material selected from trifunctional or higher-functional polyol, trifunctional or higher-functional polythiol, trifunctional or higher functional material containing both hydroxyl and SH groups; in a one-pot process.

39. Method of claim 38 wherein (c) further comprises at least one material chosen from diol, dithiol, difunctional material containing both hydroxyl and SH groups, or mixtures thereof.

40. Method of claim 39 wherein said dithiol includes dithiol oligomer.

41. The sulfur-containing polyurethane of claim 1 wherein said trifunctional or higher functional polythiol includes at least one material selected from pentaerythritol tetrakis(2-mercaptoacetate), pentaerythritol tetrakis(3-mercaptopropionate), and materials represented by the following structural formulas:

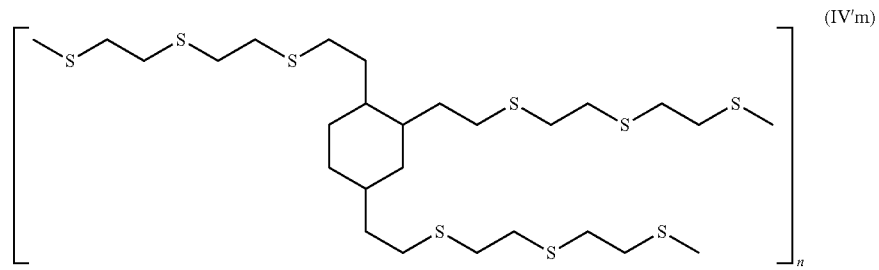

wherein n is an integer from 1 to 20

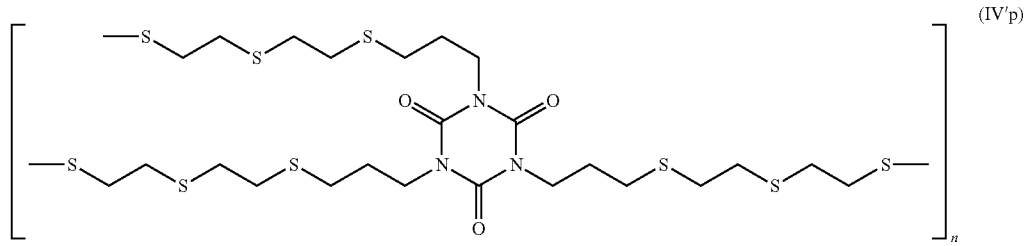

wherein n is an integer from 1 to 20

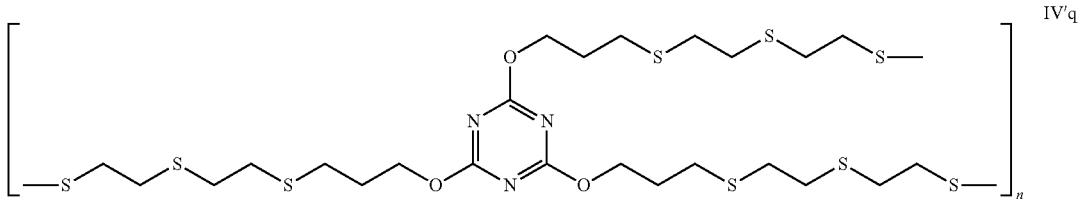

wherein n is an integer from 1 to 20.

42. The sulfur-containing polyurethane of claim 1 wherein said dithiol is chosen from aliphatic dithiols, cycloaliphatic dithiols, aromatic dithiols, dithiols having heterocyclic group, polymeric dithiols, dithiols containing ether linkages, dithiols containing one or more sulfide linkages and/or disulfide linkages, or combinations thereof.

43. The sulfur-containing polyurethane of claim 1 wherein said polythiol is chosen from aliphatic polythiols, cycloaliphatic polythiols, aromatic polythiols, polythiols having herocyclic group, polymeric polythiols, polythiols containing ether linkages, polythiols containing one or more sulfide linkages and/or disulfide linkages, or combinations thereof.

44. An optical article comprising a sulfur-containing polyurethane, wherein said sulfur-containing polyurethane comprises the reaction product of:
(I) polyisocyanate, polyisothiocyanate, or mixture thereof;
(II) polythiol oligomer; and
(III) active hydrogen-containing material including at least one material selected from trifunctional or higher-functional polyol, trifunctional or higher-functional polythiol, trifunctional or higher-functional material containing both hydroxyl and SH groups, or mixtures thereof;
wherein said polythiol oligomer (II) is the reaction product of:
(a) two or more different dienes comprising
(i) at least one first diene comprising aromatic ring-containing diene having the following structural formula:

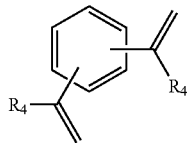

wherein $R_4$ can represent hydrogen or methyl; and
(ii) at least one second diene selected from a non-aromatic monocyclic diene, non-aromatic polycyclic diene, and mixtures thereof; and
(b) one or more dithiol, wherein the stoichiometric ratio of the sum of the number of equivalents of all polythiols to the sum of the number of equivalents of all dienes used to form said polythiol oligomer (II) is greater than 1.0:1.0.

45. A photochromic article comprising (A) a sulfur-containing polyurethane; (B) a polymerized substrate; and (C) a photochromic amount of a photochromic material wherein said photochromic material is imbibed into said substrate, and wherein said sulfur-containing polyurethane (A) comprises the reaction product of:
(I) polyisocyanate, polyisothiocyanate, or mixture thereof,
(II) polythiol oligomer, and
(III) active hydrogen-containing material including at least one material selected from trifunctional or higher-functional polyol, trifunctional or higher-functional polythiol, trifunctional or higher-functional material containing both hydroxyl and SH groups, or mixtures thereof;
wherein said polythiol oligomer (II) is the reaction product of:
(a) two or more different dienes comprising
(i) at least one first diene comprising aromatic ring-containing diene having the following structural formula:

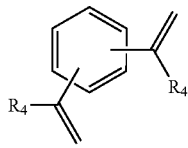

wherein $R_4$ can represent hydrogen or methyl; and
(ii) at least one second diene selected from a non-aromatic monocyclic diene, non-aromatic polycyclic diene, and mixtures thereof; and
(b) one or more dithiol; and wherein the stoichiometric ratio of the sum of the number of equivalents of all polythiols to the sum of the number of equivalents of all dienes used to form said polythiol oligomer (II) is greater than 1.0:1.0.

46. The photochromic article of claim 45 wherein said photochromic substance comprises at least one naphthopyran.

47. The photochromic article of claim 45 wherein said photochromic substance is chosen from spiro(indoline)naphthoxazines, spiro(indoline)benzoxazines, benzopyrans, naphthopyrans, organo-metal dithizonates, fulgides and fulgimides, and mixtures thereof.

* * * * *